(12) United States Patent
Stokes et al.

(10) Patent No.: US 12,371,641 B2
(45) Date of Patent: Jul. 29, 2025

(54) BOOSTER COMPOSITION FOR CLEANING FERMENTATION EQUIPMENT AND METHODS OF USE

(71) Applicant: Ecolab USA Inc., St. Paul, MN (US)

(72) Inventors: Jennifer Stokes, Rosemount, MN (US); Chris Nagel, St. Paul, MN (US); Claire Notermann, Sunfish Lake, MN (US); Sukhwan Soontravanich, Inver Grove Heights, MN (US)

(73) Assignee: ECOLAB USA INC., Saint Paul, MN (US)

( * ) Notice: Subject to any disclaimer, the term of this patent is extended or adjusted under 35 U.S.C. 154(b) by 450 days.

(21) Appl. No.: 17/878,700

(22) Filed: Aug. 1, 2022

(65) Prior Publication Data
US 2023/0049772 A1    Feb. 16, 2023

Related U.S. Application Data

(60) Provisional application No. 63/228,449, filed on Aug. 2, 2021.

(51) Int. Cl.
| | |
|---|---|
| *C11D 3/37* | (2006.01) |
| *B08B 3/08* | (2006.01) |
| *B08B 9/032* | (2006.01) |
| *B08B 9/08* | (2006.01) |
| *C11D 1/722* | (2006.01) |
| *C11D 3/00* | (2006.01) |

(Continued)

(52) U.S. Cl.
CPC .............. *C11D 3/3765* (2013.01); *B08B 3/08* (2013.01); *B08B 9/032* (2013.01); *B08B 9/0804* (2013.01); *C11D 1/722* (2013.01); *C11D 3/0026* (2013.01); *C11D 3/0073* (2013.01); *C11D 3/10* (2013.01); *C11D 3/221* (2013.01); *C11D 3/33* (2013.01); *C11D 2111/20* (2024.01)

(58) Field of Classification Search
CPC ..... C11D 3/3765; C11D 1/722; C11D 3/0026; C11D 3/0073; C11D 3/10; C11D 3/221; C11D 3/33; C11D 2111/20; B08B 3/08; B08B 9/032; B08B 9/0804
See application file for complete search history.

(56) References Cited

U.S. PATENT DOCUMENTS

| | | | |
|---|---|---|---|
| 103,662 | A | 5/1870 | Rogers |
| 509,209 | A | 11/1893 | Draper |

(Continued)

FOREIGN PATENT DOCUMENTS

| | | |
|---|---|---|
| BR | PI0905817 A2 | 7/2011 |
| CA | 1 130 692 A | 8/1982 |

(Continued)

OTHER PUBLICATIONS

International Search Report and Written Opinion for Application No. PCT/US2022/039069 mailed Dec. 22, 2022.

(Continued)

*Primary Examiner* — Sharidan Carrillo
(74) *Attorney, Agent, or Firm* — Merchant & Gould P.C.

(57) ABSTRACT

Certain booster compositions and methods of using the booster compositions to clean fermentation equipment are disclosed. The booster compositions are useful in environments with variable, changing, unstable, or limited alkalinity sources found within fermentation equipment.

13 Claims, 12 Drawing Sheets

(51) Int. Cl.
  *C11D 3/10* (2006.01)
  *C11D 3/22* (2006.01)
  *C11D 3/33* (2006.01)

(56) References Cited

U.S. PATENT DOCUMENTS

| | | |
|---|---|---|
| 544,191 A | 8/1895 | Ogden |
| 993,485 A | 5/1911 | Wildman et al. |
| 1,431,602 A | 10/1922 | Spencer |
| 1,511,590 A | 10/1924 | Buttfield |
| 1,669,394 A | 5/1928 | Ellis et al. |
| 1,681,118 A | 8/1928 | Jaschke |
| 1,681,440 A | 8/1928 | Sherman et al. |
| 1,681,441 A | 8/1928 | Sherman et al. |
| 1,693,678 A | 12/1928 | Taylor |
| 1,866,153 A | 7/1932 | Dreyfus et al. |
| 1,924,815 A | 8/1933 | Skolnik |
| 2,799,645 A | 7/1957 | Musgrove |
| 3,560,611 A | 2/1971 | Chany et al. |
| 4,481,073 A | 11/1984 | Sakai et al. |
| 4,502,892 A | 3/1985 | Westermann et al. |
| 4,507,236 A | 3/1985 | Seiler et al. |
| 4,579,676 A | 4/1986 | Bull |
| 4,863,524 A | 9/1989 | Komabashiri et al. |
| 4,878,951 A | 11/1989 | Pochard et al. |
| 4,992,078 A | 2/1991 | Meszaros |
| 5,571,446 A | 11/1996 | Rouillard |
| 5,824,531 A | 10/1998 | Outtrup et al. |
| 5,863,345 A | 1/1999 | Talley |
| 6,168,808 B1 | 1/2001 | Hamon Godin et al. |
| 6,194,367 B1 | 2/2001 | Talley |
| 6,204,231 B1 | 3/2001 | Patten et al. |
| 6,530,386 B1 | 3/2003 | Bragulla et al. |
| 6,537,960 B1 | 3/2003 | Ruhr et al. |
| 6,539,954 B1 | 4/2003 | Schimmel et al. |
| 6,541,233 B1 | 4/2003 | Hillen et al. |
| 6,554,005 B1 | 4/2003 | Cords et al. |
| 6,649,581 B1 | 11/2003 | Lalle et al. |
| 6,660,707 B2 | 12/2003 | Lentsch et al. |
| 6,686,325 B2 | 2/2004 | Hoyt et al. |
| 6,769,627 B2 | 8/2004 | Carhuff et al. |
| 7,005,514 B2 | 2/2006 | Nguyen |
| 7,247,210 B2 * | 7/2007 | Staub .................... B08B 9/0325 134/22.12 |
| 7,538,079 B2 | 5/2009 | Warr et al. |
| 7,563,858 B2 | 7/2009 | Kakihara et al. |
| 7,763,576 B2 | 7/2010 | Tjelta et al. |
| 7,803,315 B2 | 9/2010 | McDonnell et al. |
| 7,828,907 B2 | 11/2010 | Miralles et al. |
| 8,822,403 B2 | 9/2014 | Olson et al. |
| 8,871,699 B2 | 10/2014 | Silvernail et al. |
| 8,937,037 B2 | 1/2015 | Smith et al. |
| 8,945,314 B2 | 2/2015 | Walters et al. |
| 8,962,544 B2 | 2/2015 | Johnson et al. |
| 8,980,100 B2 | 3/2015 | Chidambaran |
| 9,023,778 B2 | 5/2015 | Kritzler et al. |
| 9,023,782 B2 | 5/2015 | Peitersen et al. |
| 9,139,800 B2 | 9/2015 | Monsrud et al. |
| 9,155,990 B2 | 10/2015 | Graff et al. |
| 9,193,938 B2 | 11/2015 | Nishio et al. |
| 9,206,380 B2 * | 12/2015 | Erickson ................ C11D 3/386 |
| 9,303,237 B2 | 4/2016 | Walters et al. |
| 9,458,440 B2 | 10/2016 | Makinen et al. |
| 9,476,017 B2 | 10/2016 | Theyssen et al. |
| 9,480,269 B2 | 11/2016 | Kulazhanov et al. |
| 9,845,447 B2 | 12/2017 | Erickson et al. |
| 10,017,719 B2 | 7/2018 | Glasbey et al. |
| 10,047,323 B2 | 8/2018 | Letzelter et al. |
| 10,260,025 B2 | 4/2019 | Erickson et al. |
| 10,266,794 B2 | 4/2019 | Hunt, Jr. et al. |
| 10,416,169 B2 | 9/2019 | Li et al. |
| 10,494,597 B2 | 12/2019 | Bernfeld et al. |
| 10,655,086 B2 | 5/2020 | Cabanas et al. |
| 10,697,029 B2 | 6/2020 | Nakazawa |
| 10,751,762 B2 | 8/2020 | Carter et al. |
| 11,028,344 B2 | 6/2021 | Chaudhari et al. |
| 11,168,285 B2 | 11/2021 | Dörries et al. |
| 11,291,958 B2 | 4/2022 | Schacht et al. |
| 11,473,034 B2 | 10/2022 | Theiner et al. |
| 2003/0015219 A1 | 1/2003 | Kravitz et al. |
| 2004/0173244 A1 | 9/2004 | Strothoff et al. |
| 2005/0082224 A1 | 4/2005 | Glynn |
| 2006/0042665 A1 | 3/2006 | Fernholz et al. |
| 2006/0046945 A1 | 3/2006 | Herdt et al. |
| 2006/0199742 A1 | 9/2006 | Arisz et al. |
| 2006/0199750 A1 | 9/2006 | Berger et al. |
| 2008/0105282 A1 | 5/2008 | Fernholz et al. |
| 2009/0117499 A1 | 5/2009 | Kim et al. |
| 2010/0000579 A1 | 1/2010 | Reinbold et al. |
| 2014/0238445 A1 | 8/2014 | Stokes et al. |
| 2014/0302570 A1 | 10/2014 | El-Shafie |
| 2014/0366920 A1 | 12/2014 | Bohme et al. |
| 2016/0326461 A1 | 11/2016 | Fox et al. |
| 2017/0028449 A1 | 2/2017 | Fernholz et al. |
| 2017/0144198 A1 | 5/2017 | Fernholz et al. |
| 2017/0253846 A1 | 9/2017 | Bernfeld et al. |
| 2017/0292095 A1 | 10/2017 | Andersen et al. |
| 2018/0000100 A1 | 1/2018 | Liimatta et al. |
| 2018/0291315 A1 | 10/2018 | Hershey |
| 2019/0233766 A1 | 8/2019 | Pont et al. |
| 2020/0216780 A1 | 7/2020 | Bartelme et al. |
| 2020/0346253 A1 | 11/2020 | Carter et al. |
| 2020/0362565 A1 | 11/2020 | Stearns et al. |
| 2023/0313083 A1 * | 10/2023 | Nagel .................... C12M 41/48 |

FOREIGN PATENT DOCUMENTS

| | | |
|---|---|---|
| CA | 2 229 055 C | 2/2002 |
| CN | 1132786 A | 10/1996 |
| CN | 1508076 A | 6/2004 |
| CN | 1664090 A | 9/2005 |
| CN | 1880238 A | 12/2006 |
| CN | 101054635 A | 10/2007 |
| CN | 101191782 A | 6/2008 |
| CN | 101219319 A | 7/2008 |
| CN | 101339879 A | 1/2009 |
| CN | 101580769 A | 11/2009 |
| CN | 101629242 A | 1/2010 |
| CN | 101659426 A | 3/2010 |
| CN | 101717422 A | 6/2010 |
| CN | 101780961 A | 7/2010 |
| CN | 101806005 A | 8/2010 |
| CN | 101812387 A | 8/2010 |
| CN | 101824530 A | 9/2010 |
| CN | 101891251 A | 11/2010 |
| CN | 201648136 U | 11/2010 |
| CN | 102059038 A | 5/2011 |
| CN | 102071489 A | 5/2011 |
| CN | 102091524 A | 6/2011 |
| CN | 102115983 A | 7/2011 |
| CN | 102367576 A | 3/2012 |
| CN | 102372568 A | 3/2012 |
| CN | 102397787 A | 4/2012 |
| CN | 102400167 A | 4/2012 |
| CN | 102492663 A | 6/2012 |
| CN | 102512967 A | 6/2012 |
| CN | 102604068 A | 7/2012 |
| CN | 102634329 A | 8/2012 |
| CN | 102634831 A | 8/2012 |
| CN | 102719841 A | 10/2012 |
| CN | 102746083 A | 10/2012 |
| CN | 102808193 A | 12/2012 |
| CN | 102828191 A | 12/2012 |
| CN | 102847442 A | 1/2013 |
| CN | 102911252 A | 2/2013 |
| CN | 102912329 A | 2/2013 |
| CN | 102935438 A | 2/2013 |
| CN | 202786198 U | 3/2013 |
| CN | 103046099 A | 4/2013 |
| CN | 103086545 A | 5/2013 |
| CN | 103122245 A | 5/2013 |
| CN | 103131567 A | 6/2013 |
| CN | 103205883 A | 7/2013 |
| CN | 103214010 A | 7/2013 |

(56) References Cited

FOREIGN PATENT DOCUMENTS

| | | |
|---|---|---|
| CN | 103254318 A | 8/2013 |
| CN | 102180493 A | 9/2013 |
| CN | 103272480 A | 9/2013 |
| CN | 103272796 A | 9/2013 |
| CN | 103288080 A | 9/2013 |
| CN | 103320805 A | 9/2013 |
| CN | 103374861 A | 10/2013 |
| CN | 103526146 A | 1/2014 |
| CN | 103601216 A | 2/2014 |
| CN | 103623709 A | 3/2014 |
| CN | 103691276 A | 4/2014 |
| CN | 103710952 A | 4/2014 |
| CN | 103724542 A | 4/2014 |
| CN | 103739781 A | 4/2014 |
| CN | 103739782 A | 4/2014 |
| CN | 103752155 A | 4/2014 |
| CN | 103755871 A | 4/2014 |
| CN | 103789777 A | 5/2014 |
| CN | 103865573 A | 6/2014 |
| CN | 103899286 A | 7/2014 |
| CN | 103936866 A | 7/2014 |
| CN | 103938476 A | 7/2014 |
| CN | 103949143 A | 7/2014 |
| CN | 103977685 A | 8/2014 |
| CN | 104086674 A | 10/2014 |
| CN | 203955018 U | 11/2014 |
| CN | 104211204 A | 12/2014 |
| CN | 104213441 A | 12/2014 |
| CN | 104264171 A | 1/2015 |
| CN | 104313924 A | 1/2015 |
| CN | 104419564 A | 3/2015 |
| CN | 104420166 A | 3/2015 |
| CN | 104450307 A | 3/2015 |
| CN | 104451744 A | 3/2015 |
| CN | 104452352 A | 3/2015 |
| CN | 104480457 A | 4/2015 |
| CN | 104480484 A | 4/2015 |
| CN | 104498218 A | 4/2015 |
| CN | 104560223 A | 4/2015 |
| CN | 104628226 A | 5/2015 |
| CN | 104644630 A | 5/2015 |
| CN | 104676606 A | 6/2015 |
| CN | 104727043 A | 6/2015 |
| CN | 104762668 A | 7/2015 |
| CN | 104773739 A | 7/2015 |
| CN | 104984652 A | 10/2015 |
| CN | 104988524 A | 10/2015 |
| CN | 105129821 A | 12/2015 |
| CN | 105132216 A | 12/2015 |
| CN | 105154673 A | 12/2015 |
| CN | 105195483 A | 12/2015 |
| CN | 105200230 A | 12/2015 |
| CN | 204865497 U | 12/2015 |
| CN | 105256317 A | 1/2016 |
| CN | 105369584 A | 3/2016 |
| CN | 105536549 A | 5/2016 |
| CN | 205241577 U | 5/2016 |
| CN | 105642124 A | 6/2016 |
| CN | 105670809 A | 6/2016 |
| CN | 105749637 A | 7/2016 |
| CN | 105753024 A | 7/2016 |
| CN | 105834237 A | 8/2016 |
| CN | 105855561 A | 8/2016 |
| CN | 105904613 A | 8/2016 |
| CN | 105968398 A | 9/2016 |
| CN | 106083598 A | 11/2016 |
| CN | 106219678 A | 12/2016 |
| CN | 106245259 A | 12/2016 |
| CN | 106277048 A | 1/2017 |
| CN | 106279026 A | 1/2017 |
| CN | 106540640 A | 3/2017 |
| CN | 106638023 A | 5/2017 |
| CN | 106890849 A | 6/2017 |
| CN | 107051216 A | 8/2017 |
| CN | 107083699 A | 8/2017 |
| CN | 206566749 U | 10/2017 |
| CN | 107349181 A | 11/2017 |
| CN | 107354471 A | 11/2017 |
| CN | 107365639 A | 11/2017 |
| CN | 107474971 A | 12/2017 |
| CN | 107747728 A | 3/2018 |
| CN | 107828550 A | 3/2018 |
| CN | 107937175 A | 4/2018 |
| CN | 207288425 U | 5/2018 |
| CN | 108117885 A | 6/2018 |
| CN | 108301008 A | 7/2018 |
| CN | 108383142 A | 8/2018 |
| CN | 108384672 A | 8/2018 |
| CN | 108554186 A | 9/2018 |
| CN | 108579698 A | 9/2018 |
| CN | 108704478 A | 10/2018 |
| CN | 108914645 A | 11/2018 |
| CN | 208088002 U | 11/2018 |
| CN | 108978266 A | 12/2018 |
| CN | 109006883 A | 12/2018 |
| CN | 109019773 A | 12/2018 |
| CN | 109056016 A | 12/2018 |
| CN | 109232171 A | 1/2019 |
| CN | 109267075 A | 1/2019 |
| CN | 109279664 A | 1/2019 |
| CN | 109289538 A | 2/2019 |
| CN | 109321920 A | 2/2019 |
| CN | 109371409 A | 2/2019 |
| CN | 208511905 U | 2/2019 |
| CN | 109437155 A | 3/2019 |
| CN | 109440448 A | 3/2019 |
| CN | 109603562 A | 4/2019 |
| CN | 109731897 A | 5/2019 |
| CN | 109750505 A | 5/2019 |
| CN | 109837771 A | 6/2019 |
| CN | 209005532 U | 6/2019 |
| CN | 110075679 A | 8/2019 |
| CN | 110102537 A | 8/2019 |
| CN | 110106730 A | 8/2019 |
| CN | 110160392 A | 8/2019 |
| CN | 110172845 A | 8/2019 |
| CN | 110220830 A | 9/2019 |
| CN | 110359198 A | 10/2019 |
| CN | 110395868 A | 11/2019 |
| CN | 110565036 A | 12/2019 |
| CN | 110565246 A | 12/2019 |
| CN | 110597026 A | 12/2019 |
| CN | 209721992 U | 12/2019 |
| CN | 209721993 U | 12/2019 |
| CN | 110644225 A | 1/2020 |
| CN | 110670073 A | 1/2020 |
| CN | 210014082 U | 2/2020 |
| CN | 110903461 A | 3/2020 |
| CN | 110961405 A | 4/2020 |
| CN | 110975559 A | 4/2020 |
| CN | 111015141 A | 4/2020 |
| CN | 210332086 U | 4/2020 |
| CN | 111088705 A | 5/2020 |
| CN | 111286729 A | 6/2020 |
| CN | 111286996 A | 6/2020 |
| CN | 111304666 A | 6/2020 |
| CN | 210710871 U | 6/2020 |
| CN | 111393273 A | 7/2020 |
| CN | 111408730 A | 7/2020 |
| CN | 111560778 A | 8/2020 |
| DE | 2 259 201 A1 | 6/1974 |
| DE | 36 35 357 A1 | 4/1988 |
| DE | 36 41 170 A1 | 6/1988 |
| DE | 296 680 A5 | 12/1991 |
| DE | 199 33 607 A1 | 1/2001 |
| EP | 967 003 A1 | 12/1999 |
| EP | 382 354 A1 | 1/2004 |
| EP | 004 314 B1 | 6/2018 |
| ES | 606 360 T5 | 10/2020 |
| FR | 707 672 A1 | 1/1995 |
| GB | 317 576 A | 5/1973 |
| JP | 55-61996 A | 5/1980 |
| JP | 61-14232 A | 1/1986 |
| JP | 2000-288567 A | 10/2000 |

(56) References Cited

FOREIGN PATENT DOCUMENTS

| | | |
|---|---|---|
| JP | 2001-164289 A | 6/2001 |
| JP | 2002-285198 A | 10/2002 |
| JP | 2003-144795 A | 5/2003 |
| JP | 2004-231868 A | 8/2004 |
| JP | 2005-40756 A | 2/2005 |
| JP | 2005-42026 A | 2/2005 |
| JP | 2005-193119 A | 7/2005 |
| JP | 3965570 B2 | 6/2007 |
| JP | 4263914 B2 | 5/2009 |
| JP | 4538881 B2 | 9/2010 |
| JP | 2010-280866 A | 12/2010 |
| JP | 5207161 B2 | 6/2013 |
| JP | 2014-4544 A | 1/2014 |
| JP | 5390821 B2 | 1/2014 |
| JP | 2014-171967 A | 9/2014 |
| JP | 2015-77541 A | 4/2015 |
| JP | 2018-193464 A | 12/2018 |
| JP | 2019-5979 A | 1/2019 |
| JP | 2019-47779 A | 3/2019 |
| JP | 2019-48290 A | 3/2019 |
| JP | 6637657 B2 | 1/2020 |
| JP | 2020-141597 A | 9/2020 |
| KR | 10-0650447 B1 | 11/2006 |
| KR | 10-0722655 B1 | 5/2007 |
| KR | 10-0893591 B1 | 4/2009 |
| KR | 10-2009-0043842 A | 5/2009 |
| KR | 10-1451598 B1 | 10/2014 |
| KR | 10-1849340 B1 | 4/2018 |
| KR | 10-2157164 B1 | 9/2020 |
| NZ | 592484 A | 2/2012 |
| RU | 2 310 951 C1 | 11/2007 |
| SU | 669176 A1 | 6/1979 |
| WO | WO 97/05227 A1 | 2/1997 |
| WO | WO 97/07190 A1 | 2/1997 |
| WO | WO 98/22566 A1 | 5/1998 |
| WO | WO 01/64852 A1 | 9/2001 |
| WO | WO 02/08371 A2 | 1/2002 |
| WO | WO 2004/052564 A1 | 6/2004 |
| WO | WO 2008/021971 A1 | 2/2008 |
| WO | WO 2008/110205 A1 | 9/2008 |
| WO | WO 2012/062372 A1 | 5/2012 |
| WO | WO 2013/040861 A1 | 3/2013 |
| WO | WO 2013/040862 A1 | 3/2013 |
| WO | WO 2013/041131 A1 | 3/2013 |
| WO | WO 2014/021902 A1 | 2/2014 |
| WO | WO 2014/058402 A2 | 4/2014 |
| WO | WO 2016/079110 A2 | 5/2016 |

OTHER PUBLICATIONS

Gesan-Guiziou et al., "Nanofiltration for the recovery of caustic cleaning-in-place solutions: robustness towards large variations of composition," Journal of Dairy Research, vol. 69, No. 4, pp. 633-643 (2002) Abstract Only.

Kingma, "Compatibility of nonionic surfactants with membrane materials and their cleaning performance," Food and Bioproducts Processing, vol. 93, pp. 304-309 (Jan. 2015).

Mc Loughlin Sequeira, "Enzymes to the Rescue: how enzymes are making laundry more sustainable by Group 1," 2 pages (Jan. 28, 2018).

Owen, "Bacterial Deterioration of Sugars," Louisiana Planter and Sugar Manufacturer, vol. 46, No. 10, pp. 153-155 (Mar. 11, 1911).

\* cited by examiner

BOOSTER COMPOSITION FOR CLEANING FERMENTATION EQUIPMENT AND METHODS OF USE

CROSS REFERENCE TO RELATED APPLICATIONS

This application claims priority to provisional application No. 63/228,449, filed Aug. 2, 2021, entitled "Booster Composition for Cleaning Fermentation Equipment and Methods of Use", which is incorporated by reference herein in its entirety.

BACKGROUND

Fermentation reactions are used to grow biological materials such as bacteria and yeasts, produce products such as ethanol, beer, wine, and spirits, and in industrial processes such as wastewater treatment. Fermentation reactions run best when the equipment is cleaned and sanitized frequently. During the fermentation reaction in large vessels, carbon dioxide is generated and remains trapped in the equipment as the equipment is emptied. Unless evacuated in a time-consuming and expensive step, carbon dioxide is present during the cleaning operation. Fermentation equipment is cleaned throughout different industries in a clean-in-place (CIP) process. CIP processes use circulating water and chemical additives through the equipment so that the equipment can be cleaned "in place" without needing to be disassembled or manually cleaned. Sodium hydroxide is commonly used in such CIP processes. When cleaning fermentation equipment, the residual carbon dioxide within the equipment converts sodium hydroxide into less effective alkaline agents including sodium carbonate and sodium bicarbonate. Currently, the conversion of sodium hydroxide to sodium carbonate or sodium bicarbonate is overcome by adding excess sodium hydroxide, sometimes to concentrations as high as 10% sodium hydroxide dissolved in the solution circulating through the CIP system. This is often wasteful and inefficient. There is a need for more effective methods of cleaning fermentation equipment.

SUMMARY

The present disclosure relates to use of a booster composition in cleaning fermentation equipment.

One aspect of the disclosure relates to a method of cleaning fermentation equipment comprising circulating an alkali metal hydroxide solution from a storage tank through a clean-in-place system comprising a first circuit comprising a first fluid path from the storage tank, through the first circuit, and back to the storage tank, and a second circuit comprising a second fluid path from the storage tank, to a fermentation tank along the second circuit, and back to the storage tank, wherein the first fluid path and the second fluid path are different and the first fluid path does not pass through the fermentation tank. A first composition is added to the alkali metal hydroxide solution in the second circuit after the storage tank and before, in, or after the fermentation tank to form a second composition. The first composition includes at least one of a surfactant, a polymer, and a chelating agent. After the fermentation tank, the second composition is returned to the storage tank. In some embodiments, the second composition is recirculated back in the fermentation tank. In some embodiments, the alkali metal hydroxide that is circulated through the fermentation tank reacts with carbon dioxide or carbonic acid in the fermentation tank to form alkali metal carbonate or alkali metal bicarbonate. In some embodiments, the second composition comprises the first composition and a combination of alkali metal hydroxide, alkali metal carbonate, and alkali metal bicarbonate. In other embodiments, the alkali metal hydroxide is completely converted over to carbonate or bicarbonate and the second composition is free or substantially free of the alkali metal hydroxide.

Another aspect of the disclosure relates to a boosted cleaning composition comprising one or more of an alcohol alkoxylate, EDTA, acrylic acid polymer, and one or more reaction products of an alkali metal hydroxide with carbon dioxide or carbonic acid. In some embodiments, the boosted cleaning composition consists of feed additive-compatible materials.

DETAILED DESCRIPTION

Figure 1:
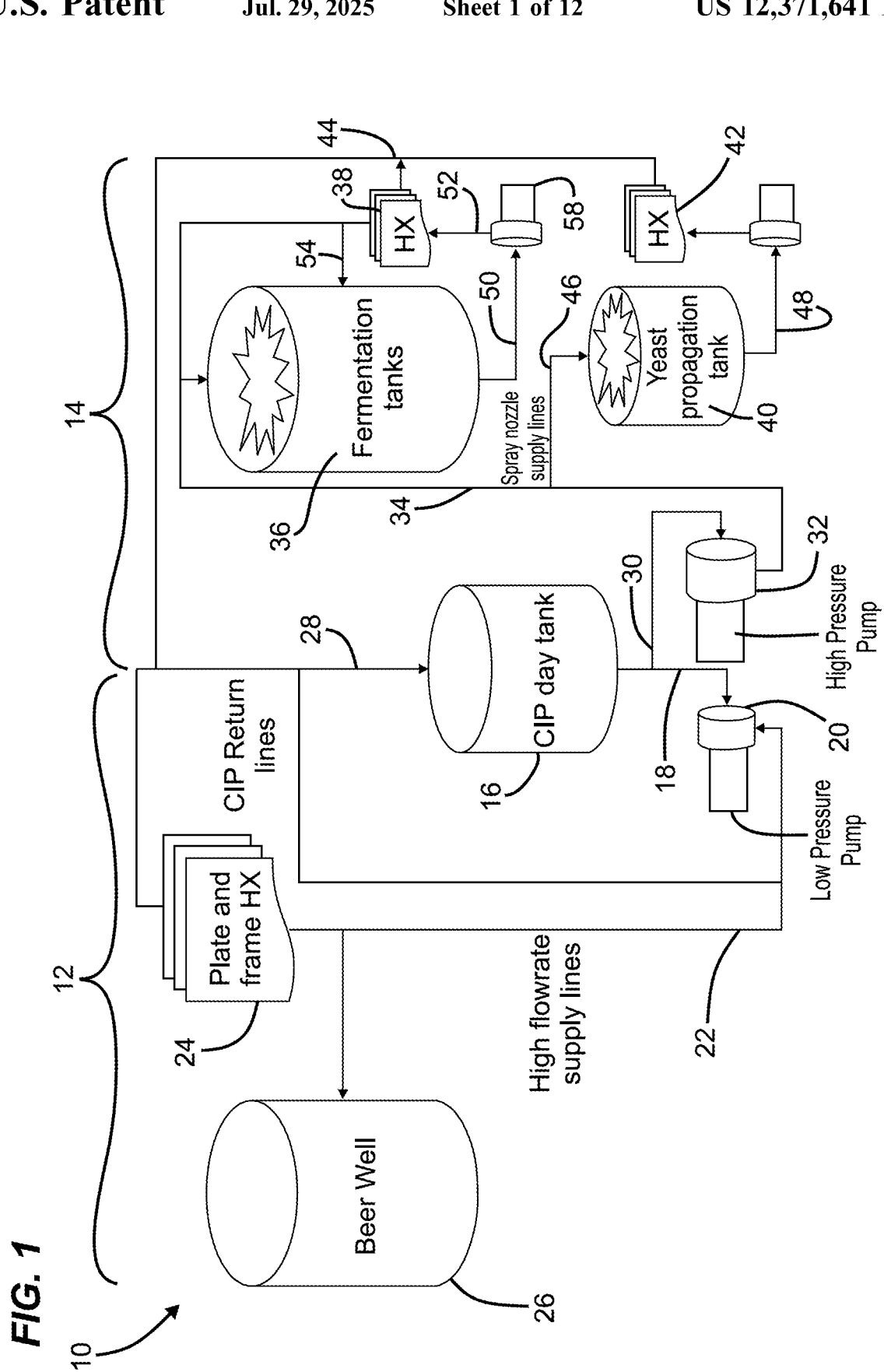
FIG. 1 is a schematic of a clean-in-place process in a fermentation process.

Fermentation reactions use biological organisms like bacteria and yeast to convert sugars into byproducts like alcohol or other specialty chemicals. Carbon dioxide is often released in this process. Fermentation reactions leave equipment soiled with plant material, mineral deposits, fats, oils, proteins, and residual sugars and polysaccharides that need to be removed from the equipment. Sodium hydroxide is typically used to clean fermentation equipment. But, residual carbon dioxide within the fermentation equipment converts the sodium hydroxide into less effective forms of alkalinity including sodium carbonate and sodium bicarbonate. Sodium hydroxide is a powerful and low cost clean-in-place cleaner. Sodium carbonate and sodium bicarbonate may be used in clean-in-place cleaning but present lower concentrations of the corrosive hydroxyl ion (—OH) and are not as powerful cleaners. The pH of a sodium hydroxide-based clean-in-place solution is typically around 12. The pH of a similar sodium carbonate or sodium bicarbonate solution is typically between 8 and 10. Currently, the problem of sodium hydroxide conversion into carbonate and bicarbonate is addressed by overdosing the sodium hydroxide or adding additional sodium hydroxide. This results in using a larger amount of sodium hydroxide than necessary, which adds to the cost of cleaning fermentation equipment and an inefficient use of chemistry.

A CIP system is made up of a number of interconnected pieces of equipment and pipes, high and low pressure pumps, valves, and controllers that connect the equipment and facilitate the flow of solution through the pieces of equipment. Exemplary pieces of equipment include spray dryers, drum dryers, fermentation tanks, heat exchangers (such as tube-in-tube or plate and frame), tanks, chemical storage tanks, product storage tanks, coolers, evaporators, sieves, filters, beerwell tanks, condensers, the pumps and lines interconnecting the equipment, and the like. These pieces of equipment are connected to various storage tanks used during product manufacturing. They are also connected to a CIP system for facilitating the cleaning of the equipment and lines without needing to dismantle the equipment or manually clean the equipment. Part of the CIP system is one or more tanks for storing the chemicals used to clean during the CIP process. When an alkali metal hydroxide such as sodium hydroxide or potassium hydroxide is used during the CIP operation, concentrated alkali metal hydroxide is mixed with water to form a diluted CIP solution. This CIP solution is stored in a tank and connected to the CIP system.

During a typical CIP operation, the product operation (e.g., the making of ethanol, or beer, or other fermentation reaction) is stopped. The product may or may not be drained from the equipment. Cleaning chemistry from the storage tank is added or dosed into the lines leading away from the storage tank. The CIP solution is pumped from the storage tank using various pumps. Once the solution has been pumped through the system, it is sent back to the storage tank. The same solution may be circulated or recirculated through the CIP system multiple times.

FIG. 1 shows a schematic of clean-in-place system 10 generally. The equipment and set up in FIG. 1 are specifically for a fuel ethanol fermentation operation but similar fluid flows could be used in other applications. FIG. 1 shows two clean-in-place circuits 12, 14. It is understood that the present disclosure can be used in plants with multiple CIP circuits. One circuit 12 passes through a portion of the CIP system without a fermentation tank. Alkali metal hydroxide is mixed with water to form a CIP solution and stored in storage tank 16. The CIP solution is dosed into line 18 and passes through pump 20 and line 22. The CIP solution also passes through equipment such as heat exchangers, beer wells, evaporators, mixing tanks, storage tanks, and the like. After completing the circuit, the CIP solution is returned back to the storage tank 16 by line 28.

In FIG. 1, circuit 14 shows the CIP solution leaving the storage tank 16, passing through line 30 and pump 32 and line 34. It then passes through the fermentation tank 36 and optionally other equipment such as heat exchangers 38 and 42, and tank 40. After leaving the fermentation tank 36, the CIP solution flows through line 44 and eventually joins line 28 and returns back to the storage tank 16. Circuits 12 and 14 are not connected except where the CIP solution is flowing into or out of the CIP storage tank 16 at lines 18 and 28.

FIG. 1 shows one storage tank 16, but it is understood that a plant could be using multiple storage tanks. Using a single chemical or chemical blend to clean the entire plant is beneficial because it allows for a single storage tank 16 to be used to store the cleaning chemistry. This makes sourcing the chemistry, storing the chemistry, and executing the clean-in-place program more streamlined and saves money on the equipment. Using multiple storage tanks may be beneficial depending on the cleaning protocol that a plant is using.

Figure 2:
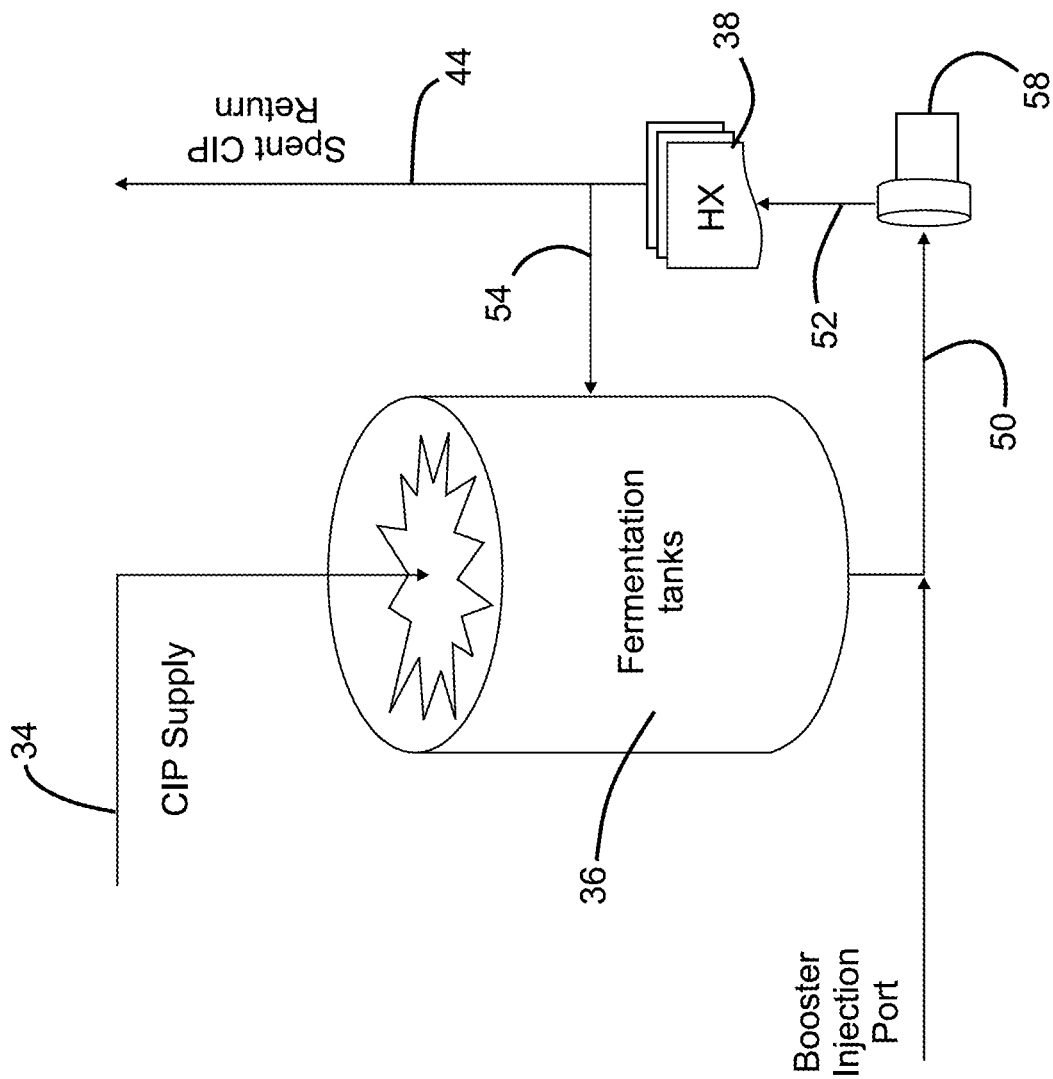
FIG. 2 is a schematic of a fermentation tank.

FIG. 2 shows a schematic of the fermentation tank 36. Fermentation tanks can be extremely large vessels with volumes of up to 4000 m³. They are usually steel and include spray nozzles for use during cleaning. CIP solution flows into fermentation tank 36 from line 34. Fermentation tanks may have two or more spray nozzles near the top of the tank. Some CIP systems may have a short recirculating loop that allows the fluid in the fermentation tank to recirculate "on itself" through the fermentation tank 36 by traveling through heat exchanger 38, the fermenter pump, and returning back to the fermentation tank 36 by line 54, rather than traveling through the entire CIP system.

When an alkali metal hydroxide, such as sodium hydroxide, contacts the carbon dioxide in the air within the fermentation equipment or entrained within the solution as carbonic acid, the carbon dioxide reacts with the sodium hydroxide to form sodium carbonate and sodium bicarbonate according to the reaction below:

$$2NaOH+CO_2 \rightarrow Na_2CO_3+H_2O$$

$$Na_2CO_3+CO_2+H_2O \rightarrow 2NaHCO_3$$

Once sodium hydroxide reacts with the carbon dioxide to form carbonates and bicarbonates, the concentration of the sodium hydroxide (or other alkali metal hydroxide) decreases and the overall pH of the solution decreases. Once this reaction has occurred, the concentration of the sodium hydroxide in the CIP solution will be greatly reduced.

In a typical CIP process, the cleaning is performed by the high pH solutions of alkali metal hydroxide. The present disclosure relates to a booster composition that is partly or fully independent of the alkaline species within the fermentation tank. This booster composition is beneficial to CIP operators because it is capable of removing soils in a number of alkaline environments and with various combinations of alkali metal hydroxides, alkali metal carbonates, alkali metal bicarbonates, and the absence of any alkaline species. This is especially beneficial for fermentation equipment where the alkaline species are variable and changing over the course of the CIP process.

The present invention is also desirable in that it specifically doses the booster composition into the second circuit 14 where the fermentation tank is located. This allows the plant operator to focus this chemistry on the fermentation equipment where the alkalinity is variable and actively decomposing, and not incur the cost of such a booster composition for the entire CIP system. In most areas of the CIP system, alkali metal hydroxide is an effective cleaner. Alkali metal hydroxide is also an effective cleaner for the soils encountered in the fermentation tank. But, the presence of the carbon dioxide converts the alkali metal hydroxide into other alkaline species before the alkali metal hydroxide has the opportunity to clean those soils in the fermentation tank. The present disclosure keeps the alkali metal hydroxide where it performs the best and adds in the booster composition for a specific area where the alkali metal hydroxide needs help. In doing so, the plant can avoid the need to overdose the alkali metal hydroxide in order to accommodate the conversion of alkali metal hydroxide into carbonate or bicarbonate. Additionally, the plant can dose in a smaller quantity of the booster composition rather than enough booster composition to clean the entire CIP system.

The Booster Composition

The booster composition includes at least one of a surfactant, a polymer, a chelating agent, or combinations of two or more of these. The booster composition may be formulated as a concentrate and diluted into the CIP solution to form a use solution when it is added to the CIP system. The components of the booster composition can be dosed as a formulated product, as individual components, or a combination thereof. For example, when the booster components are concentrated, it may be that the concentrated materials are not stable when mixed. In such cases, the individual components can be added separately into the CIP system to produce the use solution. In some embodiments, it might be possible to mix some, but not all, of the individual concentrate components. In such embodiments, two or more components can be mixed as a formulated concentrate and other components can be added separately. In some embodiments, it is also possible to add one of the booster components to the storage tank 16. Examples of this embodiment include where one of the components of the booster may be beneficial to use throughout the CIP system, but other components are specifically beneficial for the fermentation equipment. In this embodiment, one or more components of the booster composition can be added to the storage tank 16 and then the remaining components can be added in the second circuit to form the use solution.

The materials in the booster composition are selected so that the composition is compatible with the materials encountered in a CIP system including steel, carbon steel, polymer and cellulosic membranes, and elastomeric gaskets and seals.

In some embodiments, the materials in the booster composition are selected so that the composition consists of or consists essentially of materials that are food grade or feed additive compatible. CIP cleaning is often used in industrial processing equipment used to make products for human or animal consumption. Selecting materials that are food grade or feed additive compatible ensures that harmful residues are not left behind to contaminate a food product or permits the CIP solution to mix with any waste materials that are intended to be further used as animal feed.

The Food, Drug, and Cosmetic Act provides a partial list of food additive materials at 21 C.F.R. parts 573 and 579. A partial listing of substances that are considered GRAS (generally recognized as safe) is found at 21 C.F.R. parts 582 and 584. The Official Publication of the Association of American Feed Control Officials (AAFCO) includes a list of approved animal food (feed) ingredients. Many of the ingredients in the AAFCO Official Publication are not approved food additives or considered GRAS but are nevertheless recognized by the FDA as approved for animal feed as long as there are no safety concerns. In some embodiments, suitability for direct, indirect, or incidental food contact is determined by the United States Food and Drug Administration. In certain embodiments, the booster compositions disclosed herein are made with food additive materials, feed additive materials, or materials that are suitable for direct, indirect, or incidental food contact.

Surfactant

In some embodiments, the booster composition includes a surfactant. Exemplary surfactants can be nonionic, cationic, anionic, zwitterionic, or amphoteric surfactants, or combinations of such surfactants. While any surfactants can be selected, nonionic surfactants are preferred because they can avoid foaming issues presented by many surfactant types. Clean-in-place systems are typically a closed loop that rely on pumps to move the solution through the system. Foam generation puts stress on the pumps and is undesirable in clean-in-place systems. Many nonionic surfactants are naturally not foaming, especially at the temperatures used for cleaning. It is possible to select foaming surfactants and use them with non-foaming surfactants or anti-foaming agents to mitigate any foam formation.

Nonionic Surfactants

Nonionic surfactants provide soil removal and can reduce the contact angle of the solution on the surface being treated. Examples of suitable nonionic surfactants include alkyl-, aryl-, and arylalkyl-alkoxylates, alcohol alkoxylates, alkylpolyglycosides and their derivatives, amines and their derivatives, and amides and their derivatives. Additional useful nonionic surfactants include those having a polyalkylene oxide polymer as a portion of the surfactant molecule. Such nonionic surfactants include, for example, chlorine-, benzyl-, methyl-, ethyl-, propyl-, butyl- and other like alkyl-capped polyoxyethylene and/or polyoxypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines and other like nonionic compounds. Silicone surfactants can also be used.

Other examples of non-foaming, low foaming, or defoaming nonionic surfactants include block polyoxypropylene-polyoxyethylene polymeric compounds with hydrophobic blocks on the outside (ends) of the molecule, and nonionic surfactants modified by "capping" or "end blocking" terminal hydroxyl groups by reaction with a small hydrophobic molecule or by converting terminal hydroxyl groups to chloride groups. Other examples of non-foaming nonionic surfactants include alkylphenoxypolyethoxyalkanols; polyalkylene glycol condensates; defoaming nonionic surfactants having a general formula $Z[(OR)_nOH]_z$ where Z is alkoxylatable material, R is a radical, n is 10-2,000, and z is determined by the number of reactive oxyalkylatable groups; and conjugated polyoxyalkylene compounds.

In certain embodiments, the nonionic surfactant is an alcohol alkoxylate with 8 to 18 carbon atoms. The alkoxylate is typically ethylene or propylene, or a combination thereof. In some embodiments, the alkoxylate has 2 to 10 moles of alkoxylation. Examples of a suitable commercially available alcohol alkoxylate surfactants include the PLURAFAC® line of surfactants from BASF, the TOMADOL surfactants, and the GENAPOL surfactants. Alcohol alkoxylates are examples of surfactant that can considered feed additive compatible.

Anionic Surfactants

Exemplary anionic surfactants include: carboxylic acids and their salts, such as alkanoic acids and alkanoates, ester carboxylic acids (e.g. alkyl succinates), ether carboxylic acids, and the like; phosphoric acid esters and their salts; sulfonic acids and their salts, such as isethionates, alkylaryl sulfonates, alkyl sulfonates, sulfosuccinates; and sulfuric acid esters and their salts, such as alkyl ether sulfates (e.g., sodium lauryl ether sulfate), alkyl sulfates (e.g., linear alkyl sulfates, sodium lauryl sulfate), and the like. In some embodiments, it may be beneficial to use an anionic surfactant together with a nonionic surfactant for foam control where the nonionic surfactant is used above its cloud point.

Cationic Surfactants

Examples of suitable cationic surfactants include amines, such as alkylamines and their salts, alkyl imidazolines, ethoxylated amines, and quaternary ammonium compounds and their salts. Other cationic surfactants include sulfur (sulfonium) and phosphorus (phosphonium) based compounds that are analogous to the amine compounds.

Amphoteric and Zwitterionic Surfactants

Amphoteric and zwitterionic surfactants include lecithin and its derivatives and salts, derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups. Betaine and sultaine surfactants are exemplary zwitterionic surfactants for use in the present composition.

In some embodiments, the booster concentrate composition can include up to 100% wt. % (including any water that is included as part of the surfactant material), from about 90 to about 100 wt. %, from about 10 to about 30 wt. %, from about 20 to about 100 wt. %, from about 30 to about 60 wt. %, or from about 30 to about 50 wt. % of surfactant. The clean-in-place use solution in the second circuit can include from about 0.0001 wt. % to about 1.0 wt. % from about 0.0005 wt. % to about 0.5 wt. %, or from about 0.0005 wt. % to about 0.1 wt. % of surfactant (including any water that is included as part of the raw material).

Polymer

In some embodiments, the booster composition includes a polymer. Exemplary polymers include polycarboxylates or polycarboxylic acids. Exemplary polycarboxylates include, but are not limited to: those having pendant carboxylate (—CO2-) groups such as acrylic homopolymers, polyacrylic acid, polylactic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. An example of a suitable commercially-available polymer includes Acumer 1000 (available from Dow Chemical).

Exemplary polymers that are not polycarboxylic acids include natural gums such as xanthan gum, guar gum, or carrageenan gum, modified starches, alginic acid, chitosan, modified cellulose, and polyvinylalcohol.

Natural gums, celluloses, and polycarboxylic acids are preferred polymers because of they are considered food grade or feed additive-compatible.

When a polymer is included in the booster concentrate composition, the polymer can be included in the booster concentrate composition in an amount of up to 100 wt. % (including any water that is included as part of the polymer material), from about 90 to about 100 wt. %, from about 10 to about 30 wt. %, from about 20 to about 100 wt. %, from about 30 to about 60 wt. %, or from about 30 to about 50 wt. % of polymer. The polymer can be present in the diluted CIP solution in the second circuit in an amount of from about 0.0001 wt. % to about 1.0 wt. % from about 0.0005 wt. % to about 0.5 wt. %, or from about 0.0005 wt. % to about 0.1 wt. % of polymer (including any water that is included as part of the raw material). Exemplary molecular weight ranges for the polymer are in the range of about 300 to about 100,000 g/mol, about 300 to about 25,000 g/mol, about 1000 to about 15,000 g/mol.

Chelating Agent

In some embodiments, the booster composition includes a chelating agent. Exemplary chelating agents include ethylenediaminetetraacetic acid (EDTA), hydroxyethyl-ethylenediaminetriacetic acid (HEDTA), methylglycinediacetic acid (MGDA), glutamic acid-N,N-diacetic acid (GLDA), iminodisuccinic acid (IDS) (commercially available as Baypure CX 100), 3-hydroxy-2-2'-iminodisuccinic acid (HIDS), diethylenetriaminepentaacetic acid (DTPA), ethylenediaminesuccinic acid (EDDS), 2-hydroxyethyliminodiacetic acid (HEIDA), hydroxyethylaminodiacetic acid, hydroxyethylenediaminetetraacetic acid, aminocarboxylates, citrate, gluconate, tartrate, lactate, and variations thereof.

When a chelating agent is included, the chelating agent can be included in the booster composition concentrate in an amount of up to 100 wt. % (including any water that is included as part of the chelating agent material), from about 90 to about 100 wt. %, from about 10 to about 30 wt. %, from about 20 to about 100 wt. %, from about 30 to about 60 wt. %, or from about 30 to about 50 wt. % of chelating agent material. The chelating agent can be present in the diluted CIP solution in the second circuit in an amount of from about 0.0001 wt. % to about 1.0 wt. % from about 0.0005 wt. % to about 0.5 wt. %, or from about 0.0005 wt. % to about 0.1 wt. % of chelating agent (including any water that is included as part of the raw material).

Antifoaming Agents

In some embodiments, the booster composition can optionally include an antifoaming agent. Exemplary antifoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane; fatty amides, hydrocarbon waxes, fatty acids, fatty esters, fatty alcohols, fatty acid soaps, ethoxylates, mineral oils, and polyethylene glycol esters. When an antifoaming agent is included, the antifoaming agent can be included in the booster composition in an amount of about 0.1 to about 50 wt. %, or about 1 to about 25 wt. %. When an antifoaming agent is included in the diluted CIP solution in the second circuit, it can be present in an amount from about 0.0001 wt. % to about 1.0 wt. % from about 0.0005 wt. % to about 0.5 wt. %, or from about 0.0005 wt. % to about 0.1 wt. % of antifoaming agent (including any water that is included as part of the raw material).

Corrosion Inhibitor

The booster composition may optionally include a corrosion inhibitor. Exemplary corrosion inhibitors include but are not limited to fatty alcohols, alkyl alkoxylates, organic sulfonates, organic sulfates, tri-, di-, or mono-glycerides and their esters, fatty acids and their salts, fatty acid esters, organic amines, gluconic acid, ascorbic acid, organic phosphates, polyacrylate, succinic acid, sugar-esters, and, salts, derivatives and mixtures thereof.

When a corrosion inhibitor is included, the corrosion inhibitor can be included in the booster composition concentrate in an amount of about 0.1 to about 15 wt. %, about 1 to about 10 wt. %, or about 1 to about 5 wt. %. When the booster composition is diluted, the corrosion inhibitor can be present in the diluted CIP solution in an amount of about 0 to about 1000 ppm.

Use of the Booster Composition

In a fermentation operation, the booster composition concentrate is combined with the clean-in-place solution to form a use solution in the CIP system. The booster composition can be added to the CIP system, preferably the second circuit 14, by injecting the booster composition concentrate into the CIP circuit upstream of the fermentation equipment, for example using a port, or directly into the circuit.

Figure 3:
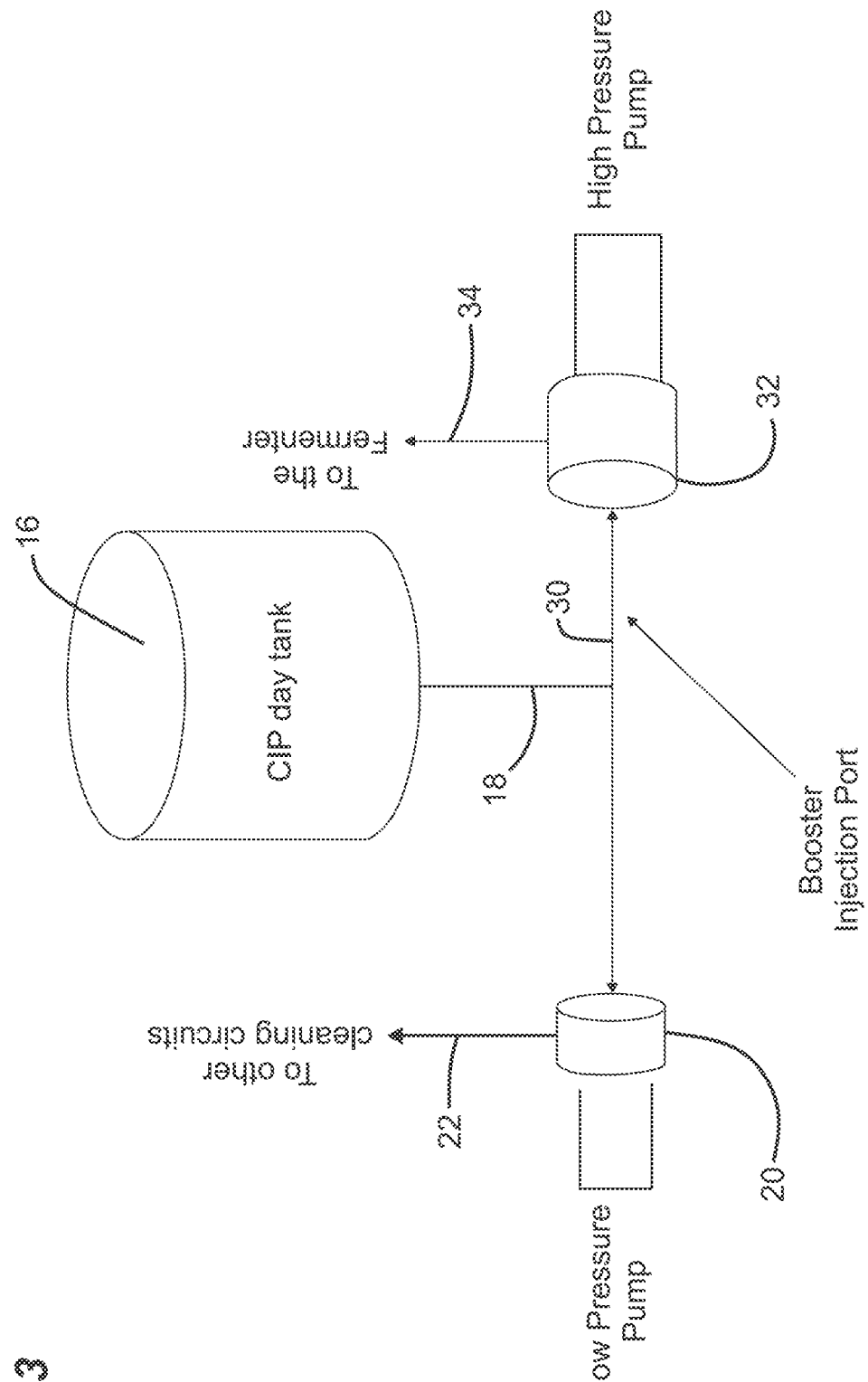
FIG. 3 is a schematic of a clean-in-place process showing an embodiment of the dosing of the booster composition.

FIG. 2 shows the booster composition being injected into a port at line 50, after the CIP solution leaves the fermentation tank 36 before being recirculated through heat exchanger 38 and back into fermentation tank 36. FIG. 3 shows the booster composition being injected into a port in line 30 before the fermentation tank 36. Other possible injection locations include in line 34 after the pump but immediately before the fermentation tank. In certain embodiments, the booster composition is added only to the second circuit 14 so that the volume of booster composition required is only enough to circulate through the second circuit 14 instead of the entire CIP system 10. It is understood that residual booster composition may make its way into the storage tank 16 as it is carried back from the fermentation tank 36, however, the amount of booster composition that is returned to storage tank 16 is anticipated to be small. Injecting the booster composition into the second circuit 14 ensures that the strongest concentration of fresh booster composition is available to clean in the fermentation tank 36. This would not be achieved to the same degree if the booster composition was injected into line 18 before line 30 because half of the booster composition would be expected to travel through the first circuit 12 and not the second circuit 14. In some embodiments, the booster composition is substantially depleted once it returns to storage tank 16. "Depleted" means that the surfactant, polymer, and chelating agent have either been consumed as a result of interacting with soils in the fermentation equipment, have been modified in such a way that they have little or no cleaning ability if they encounter soil upon being recirculated through the CIP system 10, or become so diluted when added into the storage tank 16 that they are present in too small of a concentration to provide meaningful cleaning.

An advantage in fuel ethanol CIP systems is the ability to inject chemicals into the CIP solution "on the fly" as it is pumped through spray nozzles into the fermentation vessels. Once there, the solution is recirculated in the vessel for up to an hour or more. The targeted use of the booster chemicals offers a substantially better clean in the fermentation tank with an unstable, variable, or even nonexistent alkalinity environment. It is a further advantage in fuel ethanol plants if the booster composition is substantially depleted once the cleaning cycle at the fermentation tank 36 is complete. In fuel ethanol fermentation sites, limited water treatment systems create challenging water management. For this reason, this CIP solution cannot be sent down the drain, but is pumped back to the storage tank 16, where any residual chemicals can be captured for additional cleaning.

The booster composition can be referred to as a "first composition." Once the booster composition is combined with the CIP system, and in particular the alkaline materials in the CIP system, the combined solutions can be referred to as a "second composition." The CIP system includes an alkali metal hydroxide within the storage tank 16. Sodium hydroxide is the most common alkali metal hydroxide within CIP cleaning. Other hydroxides may be used instead of or together with the sodium hydroxide including potassium hydroxide and ammonium hydroxide. Depending on the hydroxide that is used, various carbonates and bicarbonates may also be present within the fermentation tank after the alkali metal hydroxide has reacted with carbon dioxide or carbonic acid. Exemplary carbonates and bicarbonates include sodium carbonate, ammonium carbonate, potassium carbonate, sodium bicarbonate, ammonium bicarbonate, potassium bicarbonate, sodium sesquicarbonate, and the like.

In some embodiments, the addition of the booster composition to the second circuit 14 is done manually. In other embodiments, the booster composition is automatically injected into the second circuit by a controller. Automatic dosing of the booster composition can be done on a timed or volumetric basis, automatically at a predetermined time within the cleaning cycle, or when the CIP system meets or does not meet a predetermined parameter (e.g., pH, conductivity, turbidity).

After the booster composition is added to the second circuit 14, the second composition (i.e., the combination of the booster composition with the CIP solution) may be used to clean the fermentation equipment. The cleaning can be accomplished by spraying, misting, fogging, soaking, flooding, or circulating the second composition through the fermentation equipment.

In some embodiments, the second composition contacts the fermentation equipment or second circuit (by soaking, recirculating, spraying, flooding, or otherwise) for at least 20 seconds, 30 seconds, 40 seconds, 50 seconds, 60 seconds, 90 seconds, 2 minutes, 2 minutes 30 seconds, 3 minutes, 4 minutes, 5 minutes or longer and no more than 180 minutes, 120 minutes, 60 minutes, 30 minutes, 25 minutes, 20 minutes, 15 minutes, 10 minutes, 8 minutes, 7 minutes, 6 minutes, 5 minutes, 4 minutes, 3 minutes, 2 minutes 30 seconds, or 2 minutes. The second composition can contact the second circuit or fermentation equipment for 5 to 180 minutes, 10 to 60 minutes, or 20 to 30 minutes.

After the fermentation equipment has been cleaned, the used cleaning solution may be pumped back to storage tank 16. In some embodiments, the used cleaning solution is processed using the wastewater treatment process of the plant. In some embodiments, the used cleaning solution can be collected and used for another purpose. For example, in corn ethanol operations, brewing, and wine making, the plant material that remains behind after fermentation is complete can be used for another purpose such as animal feed or human food. In embodiments where the operator intends to use the residual material from the fermentation equipment, the materials for the booster composition should be selected to be compatible with the desired end use. For example, if the residual plant material is going to be used as animal feed, the materials in the booster composition should be feed additive compatible. If the residual plant material is going to be used for human food, the materials in the booster composition should be food additive compatible.

In some embodiments, the disclosed compositions are used as part of a broader cleaning regimen along with other steps. Such a cleaning regimen can include water rinses including pre- and post-cleaning rinses. The regimen can include multiple cleaning cycles using the disclosed compositions. The regimen can include additional cleaning cycles that do not include the disclosed compositions including alkaline and acid cleaning cycles.

In some embodiments, the disclosed compositions contact the second circuit or fermentation equipment at room temperature. In other embodiments, the disclosed compositions contact the second circuit or fermentation equipment at elevated temperatures of 40° C. or higher, 45° C. or higher, 50° C. or higher, 55° C. or higher, 60° C. or higher, 65° C. or higher, 70° C. or higher, 75° C. or higher, 80° C. or higher, 85° C. or higher, 90° C. or higher, 95° C. or higher, 100° C. or higher, 120° C. or higher, or 150° C. or higher. In some embodiments, the disclosed compositions contact the second circuit or fermentation equipment at elevated temperatures of about 40° C. to about 150° C., about 50° C. to about 120° C., or about 60° C. to about 100° C.

EXAMPLES

Example 1

Example 1 tested various formulas at removing soil on 304 stainless steel coupons soiled with corn mash. During the test, the soiled coupons were placed in a beaker with the test solution. The solution was agitated during the test. Soiling and cleanings were repeated over three or more cycles to determine how the solution performance held over multiple cleanings. Four coupons were tested for each composition and soil removal was averaged across the four coupons. The degree of soil removal was determined using a reflectometer and measuring the percent reflectance on each coupon. Higher gloss or reflectance measurements indicates more soil removal.

For this example, the controls used were a 3% sodium carbonate solution, a 3% sodium hydroxide solution, and water. The chemistry tested included Acusol 425N, an acrylic acid/maleic acid copolymer with a molecular weight of approximately 1900, Acusol 445N, a polyacrylic acid polymer with a molecular weight of approximately 7000, Belclene 200, a polymaleic acid polymer with a molecular weight of approximately 450, sodium gluconate, and EDTA. The Field Formula listed in Test 5 was 97.71 wt. % water, 1 wt. % sodium carbonate, 1 wt. % sodium bicarbonate, 0.02 wt. % Acusol 445N, 0.25 wt. % EDTA (40%), and 0.02 wt. % Plurafac RA300. The results are shown in Table 1 and FIG. 4.

TABLE 1

| Test | Chemistry | Reflectance 1 | Reflectance 2 | Reflectance 3 |
|---|---|---|---|---|
| 1 | Water | 183.0 | 36.7 | 82.0 |
|   | Water | 191.0 | 26.2 | 38.6 |
|   | Water | 175.0 | 27.0 | 26.5 |
|   | Water | 200.0 | 34.9 | 33.6 |
| 2 | 3% Caustic | 253.0 | 240.0 | 261.0 |
|   | 3% Caustic | 239.0 | 246.0 | 247.0 |
|   | 3% Caustic | 250.0 | 259.0 | 258.0 |
|   | 3% Caustic | 241.0 | 238.0 | 244.0 |
| 3 | 3% Carbonate | 256.0 | 176.0 | 216.0 |
|   | 3% Carbonate | 252.0 | 217.0 | 188.0 |
|   | 3% Carbonate | 246.0 | 215.0 | 180.0 |
|   | 3% Carbonate | 250.0 | 228.0 | 198.0 |
| 4 | 3% Carbonate + 1.1% EDTA + 1.1% sodium gluconate | 268.0 | 219.0 | 195.0 |
|   | 3% Carbonate + 1.1% EDTA + 1.1% sodium gluconate | 273.0 | 258.0 | 219.0 |
|   | 3% Carbonate + 1.1% EDTA + 1.1% sodium gluconate | 269.0 | 241.0 | 189.0 |
|   | 3% Carbonate + 1.1% EDTA + 1.1% sodium gluconate | 268.0 | 252.0 | 199.0 |
| 5 | 3% Caustic + 1.1% EDTA + 1.1% sodium gluconate | 271.0 | 276.0 | 273.0 |
|   | Field Formula | 271.0 | 272.0 | 273.0 |
|   | Field Formula | 269.0 | 259.0 | 264.0 |
|   | Field Formula | 272.0 | 275.0 | 279.0 |
| 6 | 3% Carbonate, 100 ppm Acusol 425N | 239.0 | 221.0 | 218.0 |
|   | 3% Carbonate, 100 ppm Acusol 425N | 262.0 | 244.0 | 229.0 |
|   | 3% Carbonate, 100 ppm Acusol 425N | 249.0 | 230.0 | 220.0 |
|   | 3% Carbonate, 100 ppm Acusol 425N | 252.0 | 244.0 | 222.0 |
| 7 | 3% Carbonate, 100 ppm Acusol 445N | 234.0 | 211.0 | 212.0 |
|   | 3% Carbonate, 100 ppm Acusol 445N | 254.0 | 233.0 | 233.0 |
|   | 3% Carbonate, 100 ppm Acusol 445N | 248.0 | 233.0 | 206.0 |
|   | 3% Carbonate, 100 ppm Acusol 445N | 230.0 | 230.0 | 220.0 |
| 8 | 3% Carbonate, 100 ppm Belclene 200 | 246.0 | 207.0 | 232.0 |
|   | 3% Carbonate, 100 ppm Belclene 200 | 263.0 | 239.0 | 226.0 |
|   | 3% Carbonate, 100 ppm Belclene 200 | 257.0 | 236.0 | 231.0 |
|   | 3% Carbonate, 100 ppm Belclene 200 | 245.0 | 230.0 | 236.0 |

Figure 4:
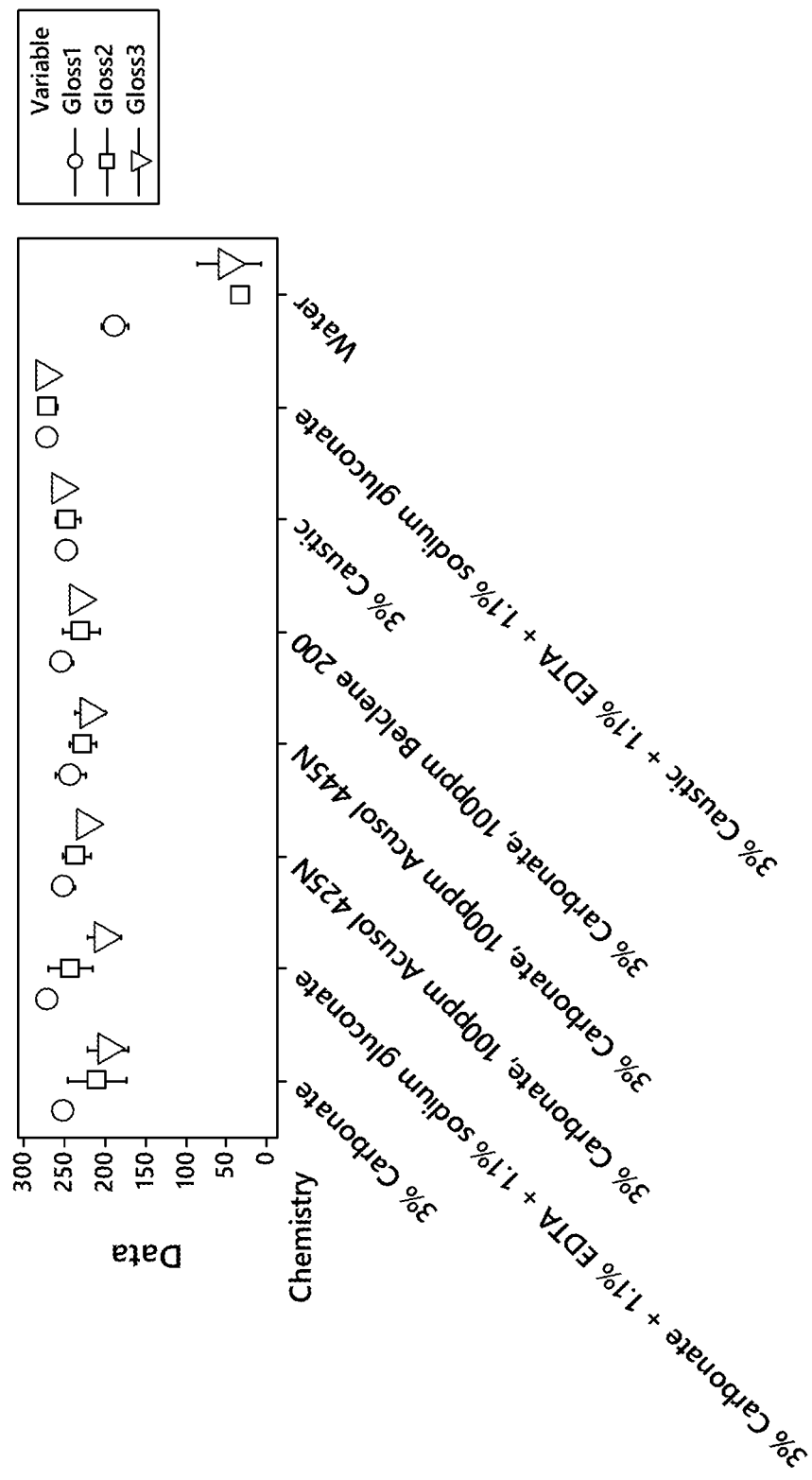
FIGS. 4 to 12 are graphical representations of the data in the examples.

The results in Table 1 and FIG. 4 indicate that the addition of polymer to the 3% sodium carbonate gave a slight improvement to cleaning performance compared to the 3% sodium carbonate solution alone. The addition of EDTA to 3% sodium hydroxide solution with 1.1% sodium gluconate gave the greatest improvement in clean, as compared to the 3% NaOH control, while the addition of EDTA in the 3% carbonate formula/1.1% sodium gluconate formula did not show an improvement in clean.

Example 2

Example 2 repeated the same soil and cleaning test method from Example 1. The controls used for this example were a 3% sodium carbonate solution and a 50/50 blend of sodium carbonate and sodium bicarbonate. The experimental formulas tested alkaline solutions with Acusol 445N, a polyacrylic acid polymer with a molecular weight of approximately 7000, Plurafac RA 300, a nonionic alcohol alkoxylate surfactant with 10-16 carbon atoms, 5 to 7 moles of ethoxylation, and 2 to 5 moles of propoxylation, or a combination. The results are shown in Table 2 and FIG. 5.

TABLE 2

| Test | Chemistry | Reflectance 1 | Reflectance 2 | Reflectance 3 |
|---|---|---|---|---|
| 1 | 3% Carbonate, 0 ppm Acusol, 0 ppm RA300 | 18.4 | 19.8 | 18.4 |
|   | 3% Carbonate, 0 ppm Acusol, 0 ppm RA300 | 20.2 | 23.3 | 19.6 |
|   | 3% Carbonate, 0 ppm Acusol, 0 ppm RA300 | 19.1 | 21.8 | 18.6 |
|   | 3% Carbonate, 0 ppm Acusol, 0 ppm RA300 | 20 | 21.5 | 20.4 |
| 2 | 50:50 Na2CO3 NaHCO3, 0 ppm Acusol, 200 ppm RA300 | 20.7 | 18.9 | 21.4 |
|   | 50:50 Na2CO3 NaHCO3, 0 ppm Acusol, 200 ppm RA300 | 23.4 | 19.8 | 20.5 |
|   | 50:50 Na2CO3 NaHCO3, 0 ppm Acusol, 200 ppm RA300 | 24.1 | 21.7 | 22 |
|   | 50:50 Na2CO3 NaHCO3, 0 ppm Acusol, 200 ppm RA300 | 21.9 | 21.5 | 20 |
| 3 | 50:50 Na2CO3 NaHCO3, 100 ppm Acusol, 100 ppm RA300 | 27.3 | 21.7 | 24.7 |
|   | 50:50 Na2CO3 NaHCO3, 100 ppm Acusol, 100 ppm RA300 | 25.6 | 22.8 | 21.3 |
|   | 50:50 Na2CO3 NaHCO3, 100 ppm Acusol, 100 ppm RA300 | 27.7 | 24.4 | 22.6 |
|   | 50:50 Na2CO3 NaHCO3, 100 ppm Acusol, 100 ppm RA300 | 26.7 | 22.8 | 21.1 |
| 4 | 50:50 Na2CO3 NaHCO3, 0 ppm Acusol, 0ppm RA300 | 20.9 | 20.3 | 20.4 |
|   | 50:50 Na2CO3 NaHCO3, 0 ppm Acusol, 0ppm RA300 | 22.9 | 23.5 | 21 |
|   | 50:50 Na2CO3 NaHCO3, 0 ppm Acusol, 0 ppm RA300 | 23.6 | 22.1 | 21 |
|   | 50:50 Na2CO3 NaHCO3, 0 ppm Acusol, 0 ppm RA300 | 22.6 | 21.2 | 20.5 |
| 5 | 50:50 Na2CO3 NaHCO3, 100 ppm Acusol, 100 ppm RA300 | 24.5 | 25.7 | 26.7 |
|   | 50:50 Na2CO3 NaHCO3, 100 ppm Acusol, 100 ppm RA300 | 25.7 | 23.8 | 25.4 |
|   | 50:50 Na2CO3 NaHCO3, 100 ppm Acusol, 100 ppm RA300 | 26.1 | 23.9 | 25.8 |
|   | 50:50 Na2CO3 NaHCO3, 100 ppm Acusol, 100 ppm RA300 | 25.9 | 22.6 | 25 |
| 6 | 3% Carbonate, 100 ppm Acusol, 100 ppm RA300 | 22.9 | 24 | 22.5 |
|   | 3% Carbonate, 100 ppm Acusol, 100 ppm RA300 | 24.5 | 23.9 | 24.2 |
|   | 3% Carbonate, 100 ppm Acusol, 100 ppm RA300 | 25.1 | 23.5 | 22.9 |
|   | 3% Carbonate, 100 ppm Acusol, 100 ppm RA300 | 22.5 | 22.8 | 20.9 |
| 7 | 50:50 Na2CO3 NaHCO3, 200 ppm Acusol, 0 ppm RA300 | 25.8 | 23.9 | 26.5 |

TABLE 2-continued

| Test | Chemistry | Reflectance 1 | Reflectance 2 | Reflectance 3 |
|---|---|---|---|---|
|  | 50:50 Na2CO3 NaHCO3, 200 ppm Acusol, 0 ppm RA300 | 25.4 | 22.7 | 25.2 |
|  | 50:50 Na2CO3 NaHCO3, 200 ppm Acusol, 0 ppm RA300 | 26.2 | 24.1 | 25.6 |
|  | 50:50 Na2CO3 NaHCO3, 200 ppm Acusol, 0 ppm RA300 | 26.6 | 25.3 | 24.8 |
| 8 | 3% Carbonate, 200 ppm Acusol, 0 ppm RA300 | 24.4 | 24.7 | 23.6 |
|  | 3% Carbonate, 200 ppm Acusol, 0 ppm RA300 | 25.2 | 24.7 | 22.6 |
|  | 3% Carbonate, 200 ppm Acusol, 0 ppm RA300 | 24.7 | 25.1 | 23.8 |
|  | 3% Carbonate, 200 ppm Acusol, 0 ppm RA300 | 26 | 23.5 | 23.2 |
| 9 | 3% Carbonate, 0 ppm Acusol, 200 ppm RA300 | 23.6 | 22.7 | 21.6 |
|  | 3% Carbonate, 0 ppm Acusol, 200 ppm RA300 | 23.4 | 23.6 | 20.3 |
|  | 3% Carbonate, 0 ppm Acusol, 200 ppm RA300 | 22.8 | 22.4 | 19.9 |
|  | 3% Carbonate, 0 ppm Acusol, 200 ppm RA300 | 22.7 | 24 | 21.9 |
| 10 | 50:50 Na2CO3 NaHCO3, 200 ppm Acusol, 200 ppm RA300 | 27.1 | 25.1 | 22.2 |
|  | 50:50 Na2CO3 NaHCO3, 200 ppm Acusol, 200 ppm RA300 | 27.3 | 26.8 | 26.9 |
|  | 50:50 Na2CO3 NaHCO3, 200 ppm Acusol, 200 ppm RA300 | 27 | 26.9 | 26.6 |
|  | 50:50 Na2CO3 NaHCO3, 200 ppm Acusol, 200 ppm RA300 | 27.1 | 26.4 | 26.5 |
| 11 | 3% Carbonate, 100 ppm Acusol, 100 ppm RA300 | 23.2 | 22.2 | 25 |
|  | 3% Carbonate, 100 ppm Acusol, 100 ppm RA300 | 23.4 | 23.6 | 24.2 |
|  | 3% Carbonate, 100 ppm Acusol, 100 ppm RA300 | 25 | 25.1 | 25.6 |
|  | 3% Carbonate, 100 ppm Acusol, 100 ppm RA300 | 23.7 | 23.6 | 23.7 |
| 12 | 3% Carbonate, 100 ppm Acusol, 100 ppm RA300 | 24.8 | 25.8 | 23.6 |
|  | 3% Carbonate, 100 ppm Acusol, 100 ppm RA300 | 24.1 | 24.3 | 24.8 |
|  | 3% Carbonate, 100 ppm Acusol, 100 ppm RA300 | 25.5 | 23.9 | 24.7 |
|  | 3% Carbonate, 100 ppm Acusol, 100 ppm RA300 | 24.2 | 24.2 | 23.8 |
| 13 | 50:50 Na2CO3 NaHCO3, 100 ppm Acusol, 100 ppm RA300 | 26.3 | 23.7 | 24.9 |
|  | 50:50 Na2CO3 NaHCO3, 100 ppm Acusol, 100 ppm RA300 | 28.3 | 24.8 | 23.4 |
|  | 50:50 Na2CO3 NaHCO3, 100 ppm Acusol, 100 ppm RA300 | 27.7 | 23.5 | 26.1 |
|  | 50:50 Na2CO3 NaHCO3, 100 ppm Acusol, 100 ppm RA300 | 26.4 | 24.5 | 24 |
| 14 | 3% Carbonate, 200 ppm Acusol, 200 ppm RA300 | 26.4 | 26.5 | 24.8 |
|  | 3% Carbonate, 200 ppm Acusol, 200 ppm RA300 | 25.1 | 24.2 | 24.7 |
|  | 3% Carbonate, 200 ppm Acusol, 200 ppm RA300 | 24.5 | 25.2 | 25.2 |
|  | 3% Carbonate, 200 ppm Acusol, 200 ppm RA300 | 25.1 | 26.1 | 25.8 |

Figure 5:
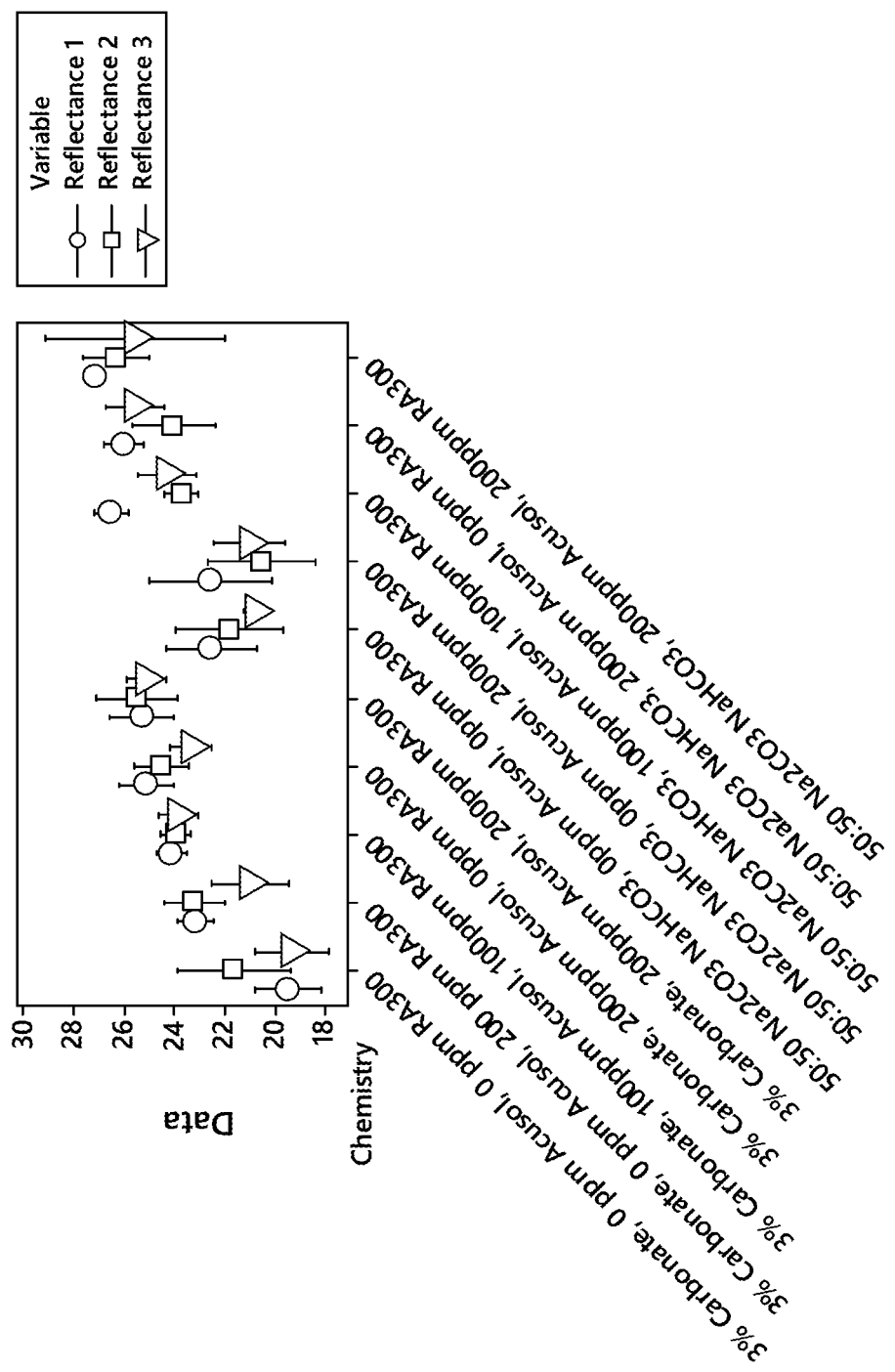

The results from Table 2 and FIG. 5 indicate that the solution with 200 ppm of acrylic acid polymer and 200 ppm of the alcohol alkoxylate surfactant were able to improve cleaning performance and soil removal compared to both the 3% sodium carbonate control and the sodium carbonate/sodium bicarbonate control. The formulas with both the polymer and the surfactant at either 100 ppm each or 200 ppm each also performed consistently well in the three soiling/cleaning cycles. In contrast, the formulas with only the surfactant either did not improve the cleaning performance of the control or did for one cleaning cycle but had a large drop in cleaning performance in cycles 2 and 3. Example 2 indicates that the addition of polymer gives improvement in cleaning performance over time. The combination of the polymer and the surfactant together provided improved performance independent of the nature of the alkaline environment and that those formulas are likely to see consistent performance in successive cleaning cycles.

Example 3

Example 3 tested three control formulas of 2.4% sodium carbonate and 2.4% sodium bicarbonate, 1.9% sodium carbonate and 1.9% sodium bicarbonate, or 1.4% sodium carbonate and 1.4% sodium bicarbonate. For the experimental formulas, Examples 3 tested combinations of sodium carbonate and sodium bicarbonate with Acusol 445N, a polyacrylic acid polymer with a molecular weight of 7,000, Plurafac RA 300, a nonionic alcohol alkoxylate surfactant with 10-16 carbon atoms, 5 to 7 moles of ethoxylation, and 2 to 5 moles of propoxylation, or EDTA, a well-known chelating agent. The results are shown in Table 3 and in FIG. 6.

TABLE 3

| Test | Chemistry | Reflectance 1 | Reflectance 2 | Reflectance 3 |
|---|---|---|---|---|
| 1 | Water | 11.7 | 3.2 | 0.9 |
|  | Water | 7.2 | 3.5 | 2.1 |
|  | Water | 9.6 | 2.2 | 1.5 |
|  | Water | 11.6 | 3.5 | 1.2 |
| 2 | 2.4% sodium carbonate and 2.4% sodium bicarbonate | 28.5 | 19.2 | 14.0 |
|  | 2.4% sodium carbonate and 2.4% sodium bicarbonate | 27.9 | 16.2 | 10.8 |
|  | 2.4% sodium carbonate and 2.4% sodium bicarbonate | 28.0 | 14.6 | 9.4 |
|  | 2.4% sodium carbonate and 2.4% sodium bicarbonate | 27.2 | 18.8 | 12.8 |
| 3 | 1.9% sodium carbonate and 1.9% sodium bicarbonate | 25.8 | 17.3 | 10.4 |
|  | 1.9% sodium carbonate and 1.9% sodium bicarbonate | 27.6 | 17.6 | 12.2 |
|  | 1.9% sodium carbonate and 1.9% sodium bicarbonate | 26.2 | 19.1 | 12.4 |
|  | 1.9% sodium carbonate and 1.9% sodium bicarbonate | 26.8 | 17.5 | 11.3 |
| 4 | 1.4% sodium carbonate and 1.4% sodium bicarbonate | 26.3 | 17.0 | 8.5 |
|  | 1.4% sodium carbonate and 1.4% sodium bicarbonate | 26.1 | 16.9 | 11.3 |
|  | 1.4% sodium carbonate and 1.4% sodium bicarbonate | 26.7 | 16.5 | 9.1 |
|  | 1.4% sodium carbonate and 1.4% sodium bicarbonate | 27.6 | 17.5 | 10.3 |
| 5 | 2.4% sodium carbonate + 2.4% sodium bicarbonate + 200 ppm Plurafac RA 300 | 27.6 | 18.7 | 12.8 |
|  | 2.4% sodium carbonate + 2.4% sodium bicarbonate + 200 ppm Plurafac RA 300 | 27.4 | 19.0 | 13.0 |
|  | 2.4% sodium carbonate + 2.4% sodium bicarbonate + 200 ppm Plurafac RA 300 | 27.3 | 19.7 | 14.9 |
|  | 2.4% sodium carbonate + 2.4% sodium bicarbonate + 200 ppm Plurafac RA 300 | 27.3 | 19.1 | 15.4 |
| 6 | 1.9% sodium carbonate + 1.9% sodium bicarbonate + 200 ppm Plurafac RA 300 | 26.7 | 21.1 | 16.0 |
|  | 1.9% sodium carbonate + .9% sodium bicarbonate + 200 ppm Plurafac RA 300 | 27.2 | 19.0 | 13.0 |
|  | 1.9% sodium carbonate + 1.9% sodium bicarbonate + 200 ppm Plurafac RA 300 | 27.4 | 20.7 | 15.7 |
|  | 1.9% sodium carbonate + 1.9% sodium bicarbonate + 200 ppm Plurafac RA 300 | 27.3 | 20.5 | 15.7 |
| 7 | 1.4% sodium carbonate + 1.4% sodium bicarbonate + 200 ppm Plurafac RA 300 | 27.3 | 20.4 | 15.7 |
|  | 1.4% sodium carbonate + 1.4% sodium bicarbonate + 200 ppm Plurafac RA 300 | 26.8 | 18.9 | 12.5 |
|  | 1.4% sodium carbonate + 1.4% sodium bicarbonate + 200 ppm Plurafac RA 300 | 27.6 | 22.2 | 16.2 |
|  | 1.4% sodium carbonate + 1.4% sodium bicarbonate + 200 ppm Plurafac RA 300 | 27.0 | 23.0 | 16.5 |

TABLE 3-continued

| Test | Chemistry | Reflectance 1 | Reflectance 2 | Reflectance 3 |
|---|---|---|---|---|
| 8 | 2.4% sodium carbonate + 2.4% sodium bicarbonate + 200 ppm Plurafac RA 300 and Acusol 445N | 27.3 | 22.0 | 19.2 |
|  | 2.4% sodium carbonate + 2.4% sodium bicarbonate + 200 ppm Plurafac RA 300 and Acusol 445N | 27.5 | 21.3 | 18.8 |
|  | 2.4% sodium carbonate + 2.4% sodium bicarbonate + 200 ppm Plurafac RA 300 and Acusol 445N | 26.6 | 19.9 | 17.8 |
|  | 2.4% sodium carbonate + 2.4% sodium bicarbonate + 200 ppm Plurafac RA 300 and Acusol 445N | 26.4 | 21.1 | 17.5 |
| 9 | 1.9% sodium carbonate + 1.9% sodium bicarbonate + 200 ppm Plurafac RA 300 and Acusol 445N | 25.5 | 18.9 | 13.4 |
|  | 1.9% sodium carbonate + 1.9% sodium bicarbonate + 200 ppm Plurafac RA 300 and Acusol 445N | 26.9 | 18.4 | 9.3 |
|  | 1.9% sodium carbonate + 1.9% sodium bicarbonate + 200 ppm Plurafac RA 300 and Acusol 445N | 26.7 | 19.9 | 13.0 |
|  | 1.9% sodium carbonate + 1.9% sodium bicarbonate + 200 ppm Plurafac RA 300 and Acusol 445N | 26.1 | 19.0 | 10.8 |
| 10 | 1.4% sodium carbonate + 1.9% sodium bicarbonate + 200 ppm Plurafac RA 300 and Acusol 445N | 27.2 | 20.2 | 16.3 |
|  | 1.4% sodium carbonate + 1.9% sodium bicarbonate + 200 ppm Plurafac RA 300 and Acusol 445N | 27.3 | 20.3 | 12.7 |
|  | 1.4% sodium carbonate + 1.9% sodium bicarbonate + 200 ppm Plurafac RA 300 and Acusol 445N | 27.3 | 19.9 | 15.3 |
|  | 1.4% sodium carbonate + 1.9% sodium bicarbonate + 200 ppm Plurafac RA 300 and Acusol 445N | 27.0 | 21.0 | 14.3 |
| 11 | 2.4% sodium carbonate + 2.4% sodium bicarbonate + 200 ppm Plurafac RA 300 and Acusol 445N, 100 ppm EDTA | 27.9 | 20.2 | 16.1 |
|  | 2.4% sodium carbonate + 2.4% sodium bicarbonate + 200 ppm Plurafac RA 300 and Acusol 445N, 100 ppm EDTA | 27.2 | 21.2 | 14.6 |
|  | 2.4% sodium carbonate + 2.4% sodium bicarbonate + 200 ppm Plurafac RA 300 and Acusol 445N, 100 ppm EDTA | 27.3 | 22.3 | 17.9 |
|  | 2.4% sodium carbonate + 2.4% sodium bicarbonate + 200 ppm Plurafac RA 300 and Acusol 445N, 100 ppm EDTA | 27.2 | 21.1 | 16.3 |
| 12 | 1.9% sodium carbonate + 1.9% sodium bicarbonate + 200 ppm Plurafac RA 300 and Acusol 445N, 100 ppm EDTA | 27.3 | 18.7 | 13.4 |
|  | 1.9% sodium carbonate + 1.9% sodium bicarbonate + 200 ppm Plurafac RA 300 and Acusol 445N, 100 ppm EDTA | 27.1 | 16.8 | 10.9 |
|  | 1.9% sodium carbonate + 1.9% sodium bicarbonate + 200 ppm Plurafac RA 300 and Acusol 445N, 100 ppm EDTA | 27.4 | 18.1 | 10.8 |
|  | 1.9% sodium carbonate + 1.9% sodium bicarbonate + 200 ppm Plurafac RA 300 and Acusol 445N, 100 ppm EDTA | 28.2 | 20.7 | 14.8 |
| 13 | 1.4% sodium carbonate + 1.4% sodium bicarbonate + 200 ppm Plurafac RA 300 and Acusol 445N, 100 ppm EDTA | 27.2 | 21.0 | 17.5 |
|  | 1.4% sodium carbonate + 1.4% sodium bicarbonate + 200 ppm Plurafac RA 300 and Acusol 445N, 100 ppm EDTA | 27.4 | 22.3 | 18.0 |
|  | 1.4% sodium carbonate + 1.4% sodium bicarbonate + 200 ppm | 27.8 | 20.8 | 16.6 |

TABLE 3-continued

| Test | Chemistry | Reflectance 1 | Reflectance 2 | Reflectance 3 |
|---|---|---|---|---|
| | Plurafac RA 300 and Acusol 445N, 100 ppm EDTA | | | |
| | 1.4% sodium carbonate + 1.4% sodium bicarbonate + 200 ppm Plurafac RA 300 and Acusol 445N, 100 ppm EDTA | 27.8 | 21.9 | 18.8 |
| 14 | 2.4% sodium carbonate + 2.4% sodium bicarbonate + 200 ppm Plurafac RA 300, 100 ppm EDTA | 27.4 | 21.7 | 16.7 |
| | 2.4% sodium carbonate + 2.4% sodium bicarbonate + 200 ppm Plurafac RA 300, 100 ppm EDTA | 27.5 | 18.8 | 13.6 |
| | 2.4% sodium carbonate + 2.4% sodium bicarbonate + 200 ppm Plurafac RA 300, 100 ppm EDTA | 28.0 | 21.3 | 16.5 |
| | 2.4% sodium carbonate + 2.4% sodium bicarbonate + 200 ppm Plurafac RA 300, 100 ppm EDTA | 26.1 | 22.2 | 17.1 |
| 15 | 1.9% sodium carbonate + 1.9% sodium bicarbonate + 200 ppm Plurafac RA 300, 100 ppm EDTA | 28.2 | 22.1 | 18.6 |
| | 1.9% sodium carbonate + 1.9% sodium bicarbonate + 200 ppm Plurafac RA 300, 100 ppm EDTA | 28.0 | 22.4 | 16.5 |
| | 1.9% sodium carbonate + 1.9% sodium bicarbonate + 200 ppm Plurafac RA 300, 100 ppm EDTA | 28.9 | 22.1 | 17.2 |
| | 1.9% sodium carbonate + 1.9% sodium bicarbonate + 200 ppm Plurafac RA 300, 100 ppm EDTA | 27.6 | 17.8 | 11.4 |
| 16 | 1.4% sodium carbonate + 1.4% sodium bicarbonate + 200 ppm Plurafac RA 300, 100 ppm EDTA | 27.3 | 20.5 | 16.7 |
| | 1.4% sodium carbonate + 1.4% sodium bicarbonate + 200 ppm Plurafac RA 300, 100 ppm EDTA | 27.6 | 22.0 | 16.5 |
| | 1.4% sodium carbonate + 1.4% sodium bicarbonate + 200 ppm Plurafac RA 300, 100 ppm EDTA | 28.2 | 23.1 | 18.6 |
| | 1.4% sodium carbonate + 1.4% sodium bicarbonate + 200 ppm Plurafac RA 300, 100 ppm EDTA | 28.6 | 20.0 | 16.4 |

Figure 6:
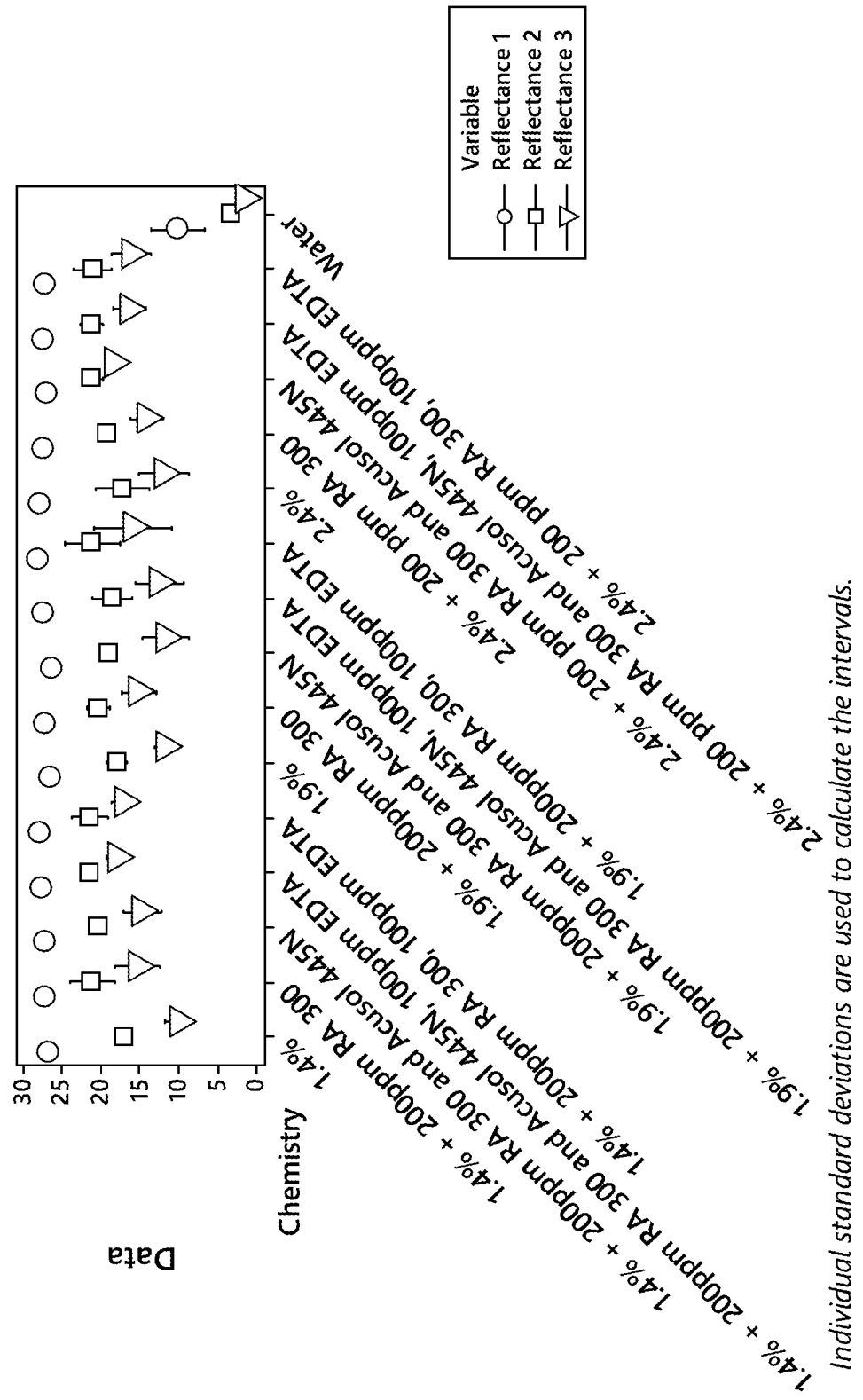

Table 3 and FIG. 6 indicate that in decreasing concentration of alkalinity, the results started to show improved cleaning with the addition of the Plurafac RA 300 surfactant, the addition of the acrylic acid polymer and the surfactant, and the EDTA chelating agent with the surfactant compared to the alkalinity alone. The best cleaning performance at the lowest alkaline levels combined the EDTA, acrylic acid polymer and surfactant.

Example 4

Example 4 is very similar to Example 3 except that the three control formulas used were 1.4% sodium carbonate and 1.4% sodium bicarbonate, 1.0% sodium carbonate and 1.0% sodium bicarbonate, or 0.6% sodium carbonate and 0.6% sodium bicarbonate. For the experimental formulas, Example 4 tested 1.4% sodium carbonate and 1.4% sodium bicarbonate, 1.0% sodium carbonate and 1.0% sodium bicarbonate, or 0.6% sodium carbonate and 0.6% sodium bicarbonate plus either the Plurafac RA 300 surfactant alone, or with the Plurafac RA 300 surfactant and Acusol 445N acrylic acid polymer, or with the Plurafac RA 300 surfactant, Acusol 445N acrylic acid polymer and an EDTA chelating agent, or with the Plurafac RA 300 with only the EDTA chelating agent. The results are shown in Table 4 and FIG. 7.

TABLE 4

| Test | Chemistry | Reflectance 1 | Reflectance 2 | Reflectance 3 |
|---|---|---|---|---|
| 1 | Water | 24.7 | 3.2 | 1.8 |
| | Water | 26.4 | 2.9 | 1.6 |
| | Water | 22.6 | 2.2 | 1.0 |
| | Water | 25.5 | 3.0 | 1.5 |
| 2 | 1.4% sodium carbonate + 1.4% sodium bicarbonate | 28.2 | 22.4 | 13.4 |
| | 1.4% sodium carbonate + 1.4% sodium bicarbonate | 28.4 | 19.4 | 12.2 |
| | 1.4% sodium carbonate + 1.4% sodium bicarbonate | 27.7 | 20.3 | 12.3 |
| | 1.4% sodium carbonate + 1.4% sodium bicarbonate | 28.4 | 23.0 | 13.5 |

TABLE 4-continued

| Test | Chemistry | Reflectance 1 | Reflectance 2 | Reflectance 3 |
|---|---|---|---|---|
| 3 | 1.0% sodium carbonate + 1.0% sodium bicarbonate | 28.0 | 22.1 | 11.0 |
|  | 1.0% sodium carbonate + 1.0% sodium bicarbonate | 27.6 | 20.6 | 12.1 |
|  | 1.0% sodium carbonate + 1.0% sodium bicarbonate | 28.0 | 22.7 | 13.9 |
|  | 1.0% sodium carbonate + 1.0% sodium bicarbonate | 28.5 | 24.0 | 15.4 |
| 4 | 0.6% sodium carbonate + 0.6% sodium bicarbonate | 27.5 | 19.0 | 10.6 |
|  | 0.6% sodium carbonate + 0.6% sodium bicarbonate | 26.4 | 9.9 | 4.4 |
|  | 0.6% sodium carbonate + 0.6% sodium bicarbonate | 27.3 | 16.2 | 8.6 |
|  | 0.6% sodium carbonate + 0.6% sodium bicarbonate | 28.8 | 19.5 | 10.5 |
| 5 | 1.4% sodium carbonate + 1.4% sodium bicarbonate + 200 ppm Plurafac RA 300 | 28.8 | 23.4 | 14.1 |
|  | 1.4% sodium carbonate + 1.4% sodium bicarbonate + 200 ppm Plurafac RA 300 | 28.9 | 23.9 | 15.4 |
|  | 1.4% sodium carbonate + 1.4% sodium bicarbonate + 200 ppm Plurafac RA 300 | 28.8 | 23.4 | 16.5 |
|  | 1.4% sodium carbonate + 1.4% sodium bicarbonate + 200 ppm Plurafac RA 300 | 28.7 | 23.0 | 16.5 |
| 6 | 1.0% sodium carbonate + 1.0% sodium bicarbonate + 200 ppm Plurafac RA 300 | 28.7 | 25.1 | 17.0 |
|  | 1.0% sodium carbonate + 1.0% sodium bicarbonate + 200 ppm Plurafac RA 300 | 28.8 | 22.9 | 14.5 |
|  | 1.0% sodium carbonate + 1.0% sodium bicarbonate + 200 ppm Plurafac RA 300 | 28.9 | 25.9 | 18.5 |
|  | 1.0% sodium carbonate + 1.0% sodium bicarbonate + 200 ppm Plurafac RA 300 | 28.9 | 26.1 | 19.7 |
| 7 | 0.6% sodium carbonate + 0.6% sodium bicarbonate + 200 ppm Plurafac RA 300 | 27.7 | 24.7 | 17.2 |
|  | 0.6% sodium carbonate + 0.6% sodium bicarbonate + 200 ppm Plurafac RA 300 | 27.3 | 21.8 | 15.9 |
|  | 0.6% sodium carbonate + 0.6% sodium bicarbonate + 200 ppm Plurafac RA 300 | 28.2 | 25.1 | 16.9 |
|  | 0.6% sodium carbonate + 0.6% sodium bicarbonate + 200 ppm Plurafac RA 300 | 28.3 | 25.3 | 17.2 |
| 8 | 1.4% sodium carbonate + 1.4% sodium bicarbonate + 200 ppm Plurafac RA 300 and Acusol 445N | 29.5 | 23.8 | 14.6 |
|  | 1.4% sodium carbonate + 1.4% sodium bicarbonate + 200 ppm Plurafac RA 300 and Acusol 445N | 28.1 | 22.4 | 14.6 |
|  | 1.4% sodium carbonate + 1.4% sodium bicarbonate + 200 ppm Plurafac RA 300 and Acusol 445N | 29.5 | 26.0 | 20.0 |
|  | 1.4% sodium carbonate + 1.4% sodium bicarbonate + 200 ppm Plurafac RA 300 and Acusol 445N | 28.0 | 19.0 | 14.0 |
| 9 | 1.0% sodium carbonate + 1.0% sodium bicarbonate + 200 ppm Plurafac RA 300 and Acusol 445N | 28.4 | 25.0 | 17.1 |
|  | 1.0% sodium carbonate + 1.0% sodium bicarbonate + 200 ppm Plurafac RA 300 and Acusol 445N | 27.4 | 25.4 | 15.8 |
|  | 1.0% sodium carbonate + 1.0% sodium bicarbonate + 200 ppm Plurafac RA 300 and Acusol 445N | 28.8 | 24.1 | 15.4 |
|  | 1.0% sodium carbonate + 1.0% sodium bicarbonate + 200 ppm Plurafac RA 300 and Acusol 445N | 28.3 | 25.1 | 15.3 |

TABLE 4-continued

| Test | Chemistry | Reflectance 1 | Reflectance 2 | Reflectance 3 |
|---|---|---|---|---|
| 10 | 0.6% sodium carbonate + 0.6% sodium bicarbonate + 200 ppm Plurafac RA 300 and Acusol 445N | 28.3 | 25.7 | 16.6 |
|  | 0.6% sodium carbonate + 0.6% sodium bicarbonate + 200 ppm Plurafac RA 300 and Acusol 445N | 28.0 | 22.4 | 15.4 |
|  | 0.6% sodium carbonate + 0.6% sodium bicarbonate + 200 ppm Plurafac RA 300 and Acusol 445N | 28.4 | 23.8 | 17.8 |
|  | 0.6% sodium carbonate + 0.6% sodium bicarbonate + 200 ppm Plurafac RA 300 and Acusol 445N | 29.0 | 25.8 | 20.2 |
| 11 | 1.4% sodium carbonate + 1.4% sodium bicarbonate + 200 ppm Plurafac RA 300 and Acusol 445N, 100 ppm EDTA | 28.4 | 25.9 | 15.8 |
|  | 1.4% sodium carbonate + 1.4% sodium bicarbonate + 200 ppm Plurafac RA 300 and Acusol 445N, 100 ppm EDTA | 28.4 | 24.8 | 16.9 |
|  | 1.4% sodium carbonate + 1.4% sodium bicarbonate + 200 ppm Plurafac RA 300 and Acusol 445N, 100 ppm EDTA | 28.3 | 21.0 | 11.6 |
|  | 1.4% sodium carbonate + 1.4% sodium bicarbonate + 200 ppm Plurafac RA 300 and Acusol 445N, 100 ppm EDTA | 28.4 | 24.0 | 15.7 |
| 12 | 1.0% sodium carbonate + 1.0% sodium bicarbonate + 200 ppm Plurafac RA 300 and Acusol 445N, 100 ppm EDTA | 27.5 | 23.3 | 12.6 |
|  | 1.0% sodium carbonate + 1.0% sodium bicarbonate + 200 ppm Plurafac RA 300 and Acusol 445N, 100 ppm EDTA | 28.1 | 25.5 | 17.3 |
|  | 1.0% sodium carbonate + 1.0% sodium bicarbonate + 200 ppm Plurafac RA 300 and Acusol 445N, 100 ppm EDTA | 28.4 | 24.1 | 17.6 |
|  | 1.0% sodium carbonate + 1.0% sodium bicarbonate + 200 ppm Plurafac RA 300 and Acusol 445N, 100 ppm EDTA | 28.7 | 25.2 | 19.7 |
| 13 | 0.6% sodium carbonate + 0.6% sodium bicarbonate + 200 ppm Plurafac RA 300 and Acusol 445N, 100 ppm EDTA | 28.4 | 25.0 | 20.1 |
|  | 0.6% sodium carbonate + 0.6% sodium bicarbonate + 200 ppm Plurafac RA 300 and Acusol 445N, 100 ppm EDTA | 28.3 | 25.3 | 19.8 |
|  | 0.6% sodium carbonate + 0.6% sodium bicarbonate + 200 ppm Plurafac RA 300 and Acusol 445N, 100 ppm EDTA | 27.7 | 25.1 | 16.9 |
|  | 0.6% sodium carbonate + 0.6% sodium bicarbonate + 200 ppm Plurafac RA 300 and Acusol 445N, 100 ppm EDTA | 28.4 | 24.6 | 19.8 |
| 14 | 1.4% sodium carbonate + 1.4% sodium bicarbonate + 200 ppm Plurafac RA 300, 100 ppm EDTA | 28.6 | 25.7 | 17.7 |
|  | 1.4% sodium carbonate + 1.4% sodium bicarbonate + 200 ppm Plurafac RA 300, 100 ppm EDTA | 28.3 | 25.5 |  |
|  | 1.4% sodium carbonate + 1.4% sodium bicarbonate + 200 ppm Plurafac RA 300, 100 ppm EDTA | 28.3 | 25.4 | 16.2 |
|  | 1.4% sodium carbonate + 1.4% sodium bicarbonate + 200 ppm Plurafac RA 300, 100 ppm EDTA | 28.7 | 26.9 | 18.6 |
| 15 | 1.0% sodium carbonate + 1.0% sodium bicarbonate + 200 ppm Plurafac RA 300, 100 ppm EDTA | 29.1 | 25.0 | 18.6 |
|  | 1.0% sodium carbonate + 1.0% sodium bicarbonate + 200 ppm Plurafac RA 300, 100 ppm EDTA | 27.9 | 26.7 | 17.6 |

TABLE 4-continued

| Test | Chemistry | Reflectance 1 | Reflectance 2 | Reflectance 3 |
|---|---|---|---|---|
|  | 1.0% sodium carbonate + 1.0% sodium bicarbonate + 200 ppm Plurafac RA 300, 100 ppm EDTA | 28.1 | 26.0 | 19.1 |
|  | 1.0% sodium carbonate + 1.0% sodium bicarbonate + 200 ppm Plurafac RA 300, 100 ppm EDTA | 27.6 | 26.0 | 21.2 |
| 16 | 0.6% sodium carbonate + 0.6% sodium bicarbonate + 200 ppm Plurafac RA 300, 100 ppm EDTA | 28.5 | 27.0 | 23.5 |
|  | 0.6% sodium carbonate + 0.6% sodium bicarbonate + 200 ppm Plurafac RA 300, 100 ppm EDTA | 28.4 | 26.7 | 22.9 |
|  | 0.6% sodium carbonate + 0.6% sodium bicarbonate + 200 ppm Plurafac RA 300, 100 ppm EDTA | 28.0 | 27.1 | 22.7 |
|  | 0.6% sodium carbonate + 0.6% sodium bicarbonate + 200 ppm Plurafac RA 300, 100 ppm EDTA | 28.6 | 25.7 | 21.7 |

Figure 7:
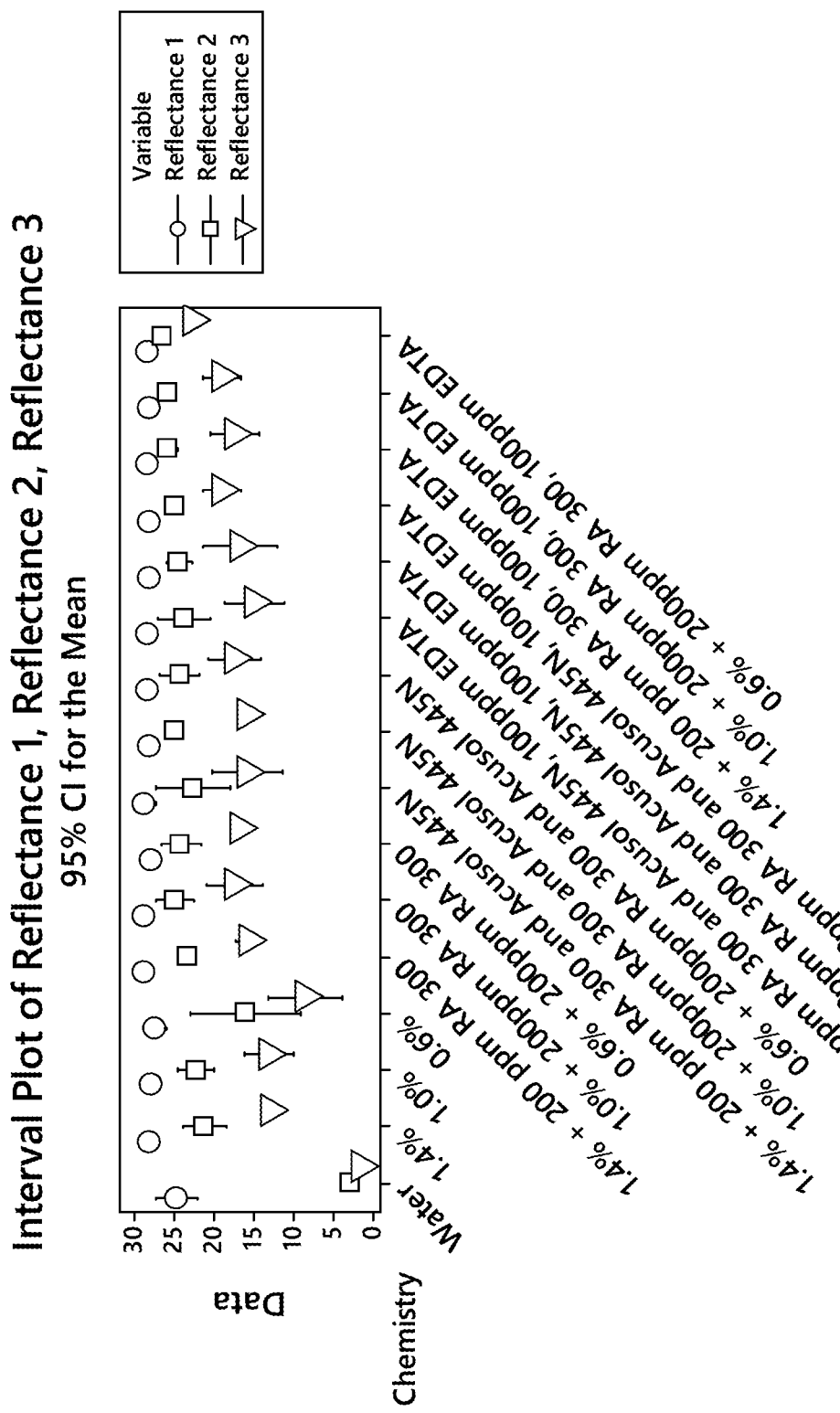

Table 4 and FIG. 7, like Table 3 and FIG. 6, indicate that the decreasing concentration of alkalinity started to show improved cleaning with the addition of the Plurafac RA 300 surfactant, the acrylic acid polymer, and the EDTA chelating agent compared to the alkalinity alone. Example 4 challenged the low concentration of alkalinity more than Example 3, reducing the concentration of the sodium carbonate and sodium bicarbonate down to 1.4%, 1.0%, and 0.6%.

Example 5

Example 5 repeated the test in Example 4 except that the alkalinity concentrations were lowered even more. Three control formulas of 1.0% sodium carbonate and 1.0% sodium bicarbonate, 0.6% sodium carbonate and 0.6% sodium bicarbonate, or 0.3% sodium carbonate and 0.3% sodium bicarbonate. For the experimental formulas, Example 5 tested the 1.0% sodium carbonate and 1.0% sodium bicarbonate, 0.6% sodium carbonate and 0.6% sodium bicarbonate, or 0.3% sodium carbonate and 0.3% sodium bicarbonate plus either Plurafac RA 300 surfactant alone, or with the Plurafac RA 300 surfactant with the Acusol 445N acrylic acid polymer, or with the Plurafac RA 300 surfactant with the Acusol 445N acrylic acid polymer and an EDTA chelating agent, or the Plurafac RA 300 surfactant with only the EDTA chelating agent. The results are shown in Table 5 and FIG. 8.

TABLE 5

| Test | Chemistry | Reflectance 1 | Reflectance 2 | Reflectance 3 |
|---|---|---|---|---|
| 1 | Water | 15.2 | 1.7 | 0.9 |
|  | Water | 11.1 | 1.9 | 1.0 |
|  | Water | 12.6 | 1.8 | 1.3 |
|  | Water | 14.0 | 2.7 | 1.4 |
| 2 | 1.0% | 27.6 | 12.9 | 6.0 |
|  | 1.0% | 23.6 | 8.9 | 6.4 |
|  | 1.0% | 25.2 | 17.1 | 12.9 |
|  | 1.0% | 24.5 | 14.1 | 12.4 |
| 3 | 0.6% | 25.5 | 17.7 | 9.3 |
|  | 0.6% | 22.6 | 9.1 | 4.1 |
|  | 0.6% | 27.2 | 14.6 | 9.3 |
|  | 0.6% | 25.9 | 16.9 | 12.8 |
| 4 | 0.3% | 27.2 | 17.7 | 16.4 |
|  | 0.3% | 27.5 | 20.6 | 16.8 |
|  | 0.3% | 28.9 | 20.9 | 12.6 |
|  | 0.3% | 27.2 | 20.5 | 12.7 |
| 5 | 1.0% + 200 ppm Plurafac RA 300 | 28.2 | 18.1 | 14.6 |
|  | 1.0% + 200 ppm Plurafac RA 300 | 28.4 | 19.8 | 16.3 |
|  | 1.0% + 200 ppm Plurafac RA 300 | 29.2 | 20.4 | 15.9 |
|  | 1.0% + 200 ppm Plurafac RA 300 | 28.9 | 19.0 | 15.6 |
| 6 | 0.6% + 200 ppm Plurafac RA 300 | 28.6 | 22.6 | 21.1 |
|  | 0.6% + 200 ppm Plurafac RA 300 | 29.5 | 24.5 | 21.5 |
|  | 0.6% + 200 ppm Plurafac RA 300 | 28.0 | 22.5 | 19.5 |
|  | 0.6% + 200 ppm Plurafac RA 300 | 27.7 | 21.1 | 21.0 |
| 7 | 0.3% + 200 ppm Plurafac RA 300 | 28.4 | 23.6 | 19.5 |
|  | 0.3% + 200 ppm Plurafac RA 300 | 27.9 | 18.1 | 14.7 |
|  | 0.3% + 200 ppm Plurafac RA 300 | 28.3 | 19.7 | 15.4 |
|  | 0.3% + 200 ppm Plurafac RA 300 | 28.1 | 18.7 | 14.1 |
| 8 | 1.0% + 200 ppm Plurafac RA 300 and Acusol 445N | 26.5 | 18.0 | 17.9 |
|  | 1.0% + 200 ppm Plurafac RA 300 and Acusol 445N | 26.5 | 15.8 | 12.3 |
|  | 1.0% + 200 ppm Plurafac RA 300 and Acusol 445N | 26.7 | 15.9 | 12.9 |

TABLE 5-continued

| Test | Chemistry | Reflectance 1 | Reflectance 2 | Reflectance 3 |
|---|---|---|---|---|
| | 1.0% + 200 ppm Plurafac RA 300 and Acusol 445N | 26.9 | 15.1 | 13.0 |
| 9 | 0.6% + 200 ppm Plurafac RA 300 and Acusol 445N | 27.6 | 21.2 | 14.9 |
| | 0.6% + 200 ppm Plurafac RA 300 and Acusol 445N | 25.8 | 18.7 | 13.1 |
| | 0.6% + 200 ppm Plurafac RA 300 and Acusol 445N | 27.8 | 19.5 | 13.4 |
| | 0.6% + 200 ppm Plurafac RA 300 and Acusol 445N | 27.8 | 17.7 | 15.4 |
| 10 | 0.3% + 200 ppm Plurafac RA 300 and Acusol 445N | 27.6 | 22.6 | 17.4 |
| | 0.3% + 200 ppm Plurafac RA 300 and Acusol 445N | 28.3 | 23.6 | 20.0 |
| | 0.3% + 200 ppm Plurafac RA 300 and Acusol 445N | 28.4 | 23.8 | 19.3 |
| | 0.3% + 200 ppm Plurafac RA 300 and Acusol 445N | 27.9 | 22.0 | 18.3 |
| 11 | 1.0% + 200 ppm Plurafac RA 300 and Acusol 445N, 100 ppm EDTA | 28.2 | 21.3 | 18.0 |
| | 1.0% + 200 ppm Plurafac RA 300 and Acusol 445N, 100 ppm EDTA | 27.0 | 19.0 | 17.8 |
| | 1.0% + 200 ppm Plurafac RA 300 and Acusol 445N, 100 ppm EDTA | 27.8 | 18.7 | 13.1 |
| | 1.0% + 200 ppm Plurafac RA 300 and Acusol 445N, 100 ppm EDTA | 26.9 | 17.7 | 16.3 |
| 12 | 0.6% + 200 ppm Plurafac RA 300 and Acusol 445N, 100 ppm EDTA | 27.8 | 19.0 | 19.7 |
| | 0.6% + 200 ppm Plurafac RA 300 and Acusol 445N, 100 ppm EDTA | 28.2 | 20.3 | 16.2 |
| | 0.6% + 200 ppm Plurafac RA 300 and Acusol 445N, 100 ppm EDTA | 27.9 | 16.1 | 14.3 |
| | 0.6% + 200 ppm Plurafac RA 300 and Acusol 445N, 100 ppm EDTA | 29.6 | 21.7 | 22.0 |
| 13 | 0.3% + 200 ppm Plurafac RA 300 and Acusol 445N, 100 ppm EDTA | 29.3 | 21.7 | 22.8 |
| | 0.3% + 200 ppm Plurafac RA 300 and Acusol 445N, 100 ppm EDTA | 30.0 | 25.2 | 23.7 |
| | 0.3% + 200 ppm Plurafac RA 300 and Acusol 445N, 100 ppm EDTA | 29.8 | 23.6 | 24.7 |
| | 0.3% + 200 ppm Plurafac RA 300 and Acusol 445N, 100 ppm EDTA | 29.7 | 22.3 | 21.6 |
| 14 | 1.0% + 200 ppm Plurafac RA 300, 100 ppm EDTA | 26.5 | 23.1 | 20.9 |
| | 1.0% + 200 ppm Plurafac RA 300, 100 ppm EDTA | 28.4 | 23.3 | 17.3 |
| | 1.0% + 200 ppm Plurafac RA 300, 100 ppm EDTA | 29.1 | 24.5 | 20.4 |
| | 1.0% + 200 ppm Plurafac RA 300, 100 ppm EDTA | 29.2 | 22.8 | 17.3 |
| 15 | 0.6% + 200 ppm Plurafac RA 300, 100 ppm EDTA | 29.0 | 22.3 | 17.5 |
| | 0.6% + 200 ppm Plurafac RA 300, 100 ppm EDTA | 28.4 | 20.3 | 19.3 |
| | 0.6% + 200 ppm Plurafac RA 300, 100 ppm EDTA | 29.1 | 21.1 | 16.7 |
| | 0.6% + 200 ppm Plurafac RA 300, 100 ppm EDTA | 28.1 | 19.9 | 18.0 |
| 16 | 0.3% + 200 ppm Plurafac RA 300, 100 ppm EDTA | 28.9 | 24.7 | 20.6 |
| | 0.3% + 200 ppm Plurafac RA 300, 100 ppm EDTA | 29.3 | 23.8 | 20.4 |
| | 0.3% + 200 ppm Plurafac RA 300, 100 ppm EDTA | 29.3 | 25.8 | 22.4 |
| | 0.3% + 200 ppm Plurafac RA 300, 100 ppm EDTA | 29.1 | 26.0 | 22.0 |

Figure 8:
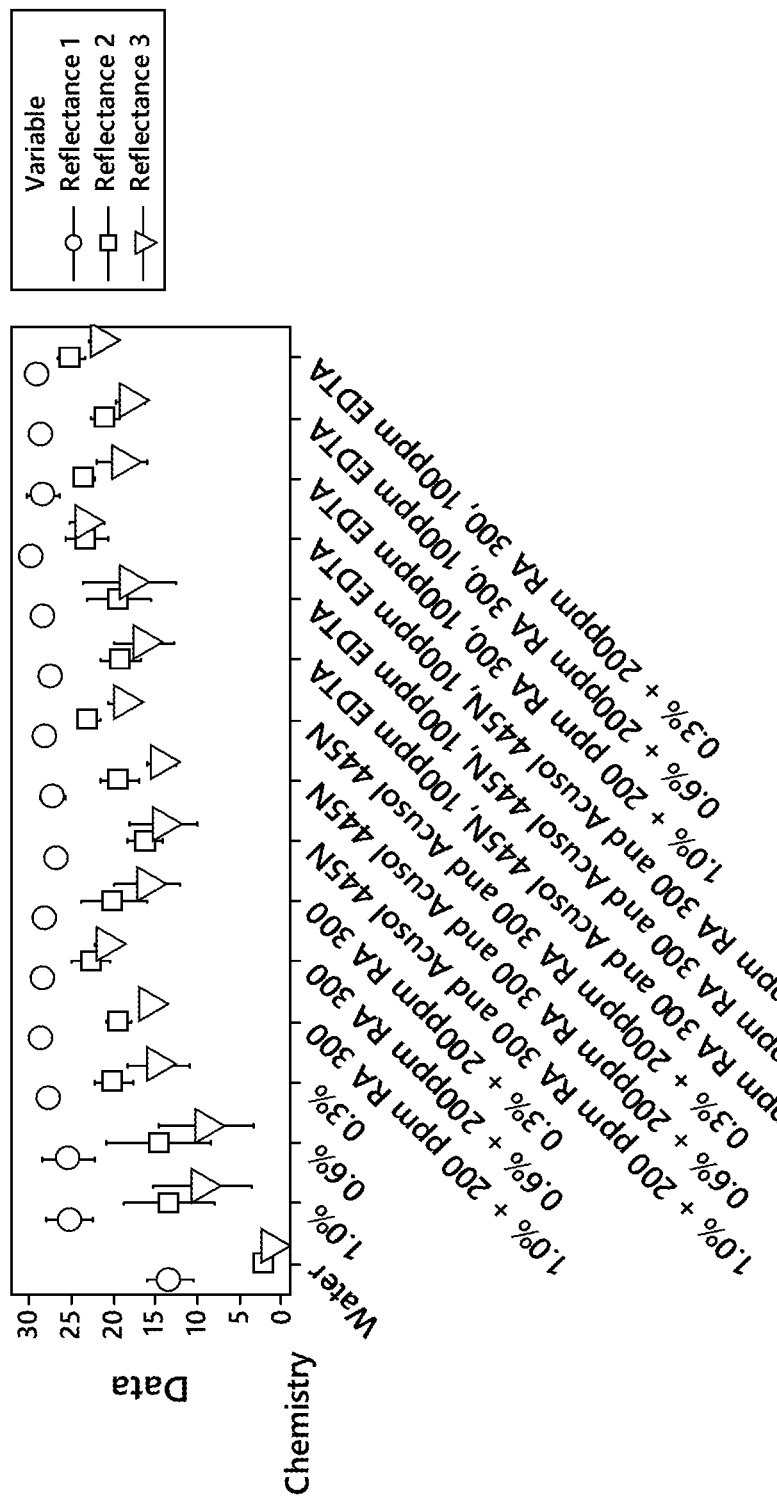

Table 5 and FIG. 8 indicate that at low levels of alkalinity, the Plurafac RA 300 surfactant alone and in combination with the Acusol 445N polymer and/or the EDTA provided comparable or improved cleaning over the alkalinity alone and maintained a high level of cleaning over multiple soiling and cleaning cycles.

Example 6

Example 6 tested cleaning performance of various formulas against three controls: water, a solution of 1.0% sodium carbonate and 1.0% sodium bicarbonate, and a solution of 0.1% sodium carbonate and 0.1% sodium bicarbonate. The results are shown in Table 6 and FIG. 9.

TABLE 6

| Test | Chemistry | Reflectance 1 | Reflectance 2 | Reflectance 3 |
|---|---|---|---|---|
| 1 | Water | 16.1 | 1.0 | 0.5 |
|   | Water | 16.6 | 1.3 | 0.8 |
|   | Water | 18.0 | 1.6 | 1.7 |
|   | Water | 17.3 | 1.6 | 1.2 |
| 2 | 1.0% sodium carbonate + sodium bicarbonate | 24.9 | 19.3 | 13.2 |
|   | 1.0% sodium carbonate + sodium bicarbonate | 23.3 | 14.4 | 11.3 |
|   | 1.0% sodium carbonate + sodium bicarbonate |  |  |  |
|   | 1.0% sodium carbonate + sodium bicarbonate | 23.5 | 18.1 | 13.7 |
| 3 | 0.1% sodium carbonate + sodium bicarbonate | 23.3 | 18.1 | 18.3 |
|   | 0.1% sodium carbonate + sodium bicarbonate | 22.6 | 16.5 | 14.8 |
|   | 0.1% sodium carbonate + sodium bicarbonate | 22.4 | 13.0 | 15.1 |
|   | 0.1% sodium carbonate + sodium bicarbonate | 21.9 | 15.7 | 16.0 |
| 4 | 200 ppm Plurafac RA 300 | 21.2 | 3.1 | 6.1 |
|   | 200 ppm Plurafac RA 300 | 19.6 | 3.1 | 4.4 |
|   | 200 ppm Plurafac RA 300 | 18.8 | 2.2 | 6.5 |
|   | 200 ppm Plurafac RA 300 | 17.6 | 2.8 | 3.0 |
| 5 | 200 ppm Plurafac RA 300 + 200 ppm Acusol 445N | 23.0 | 16.9 | 17.3 |
|   | 200 ppm Plurafac RA 300 + 200 ppm Acusol 445N | 23.9 | 15.6 | 16.4 |
|   | 200 ppm Plurafac RA 300 + 200 ppm Acusol 445N | 26.7 | 20.3 | 21.1 |
|   | 200 ppm Plurafac RA 300 + 200 ppm Acusol 445N | 23.4 | 16.6 | 17.6 |
| 6 | 200 ppm Plurafac RA 300 + 100 ppm EDTA | 27.3 | 23.3 | 22.5 |
|   | 200 ppm Plurafac RA 300 + 100 ppm EDTA | 26.3 | 22.1 | 20.1 |
|   | 200 ppm Plurafac RA 300 + 100 ppm EDTA | 27.7 | 25.2 | 21.9 |
|   | 200 ppm Plurafac RA 300 + 100 ppm EDTA | 28.1 | 24.9 | 22.3 |
| 7 | 200 ppm Plurafac RA 300 + 200 ppm Acusol 445N + 100 ppm EDTA | 29.2 | 26.8 | 24.0 |
|   | 200 ppm Plurafac RA 300 + 200 ppm Acusol 445N + 100 ppm EDTA | 29.4 | 26.2 | 24.6 |
|   | 200 ppm Plurafac RA 300 + 200 ppm Acusol 445N + 100 ppm EDTA | 30.0 | 27.5 | 22.9 |
|   | 200 ppm Plurafac RA 300 + 200 ppm Acusol 445N + 100 ppm EDTA | 29.2 | 25.8 | 23.5 |
| 8 | 0.1% sodium carbonate + 0.1% sodium bicarbonate + 200 ppm Plurafac RA 300 + 200 ppm Acusol 445N + 100 ppm EDTA | 30.2 | 29.4 | 29.0 |
|   | 0.1% sodium carbonate + 0.1% sodium bicarbonate + 200 ppm Plurafac RA 300 + 200 ppm Acusol 445N + 100 ppm EDTA | 30.7 | 29.6 | 28.5 |
|   | 0.1% sodium carbonate + 0.1% sodium bicarbonate + 200 ppm Plurafac RA 300 + 200 ppm Acusol 445N + 100 ppm EDTA | 29.2 | 26.4 | 27.5 |

TABLE 6-continued

| Test | Chemistry | Reflectance 1 | Reflectance 2 | Reflectance 3 |
|---|---|---|---|---|
| | 0.1% sodium carbonate + 0.1% sodium bicarbonate + 200 ppm Plurafac RA 300 + 200 ppm Acusol 445N + 100 ppm EDTA | 28.4 | 27.6 | 26.1 |

Figure 9:
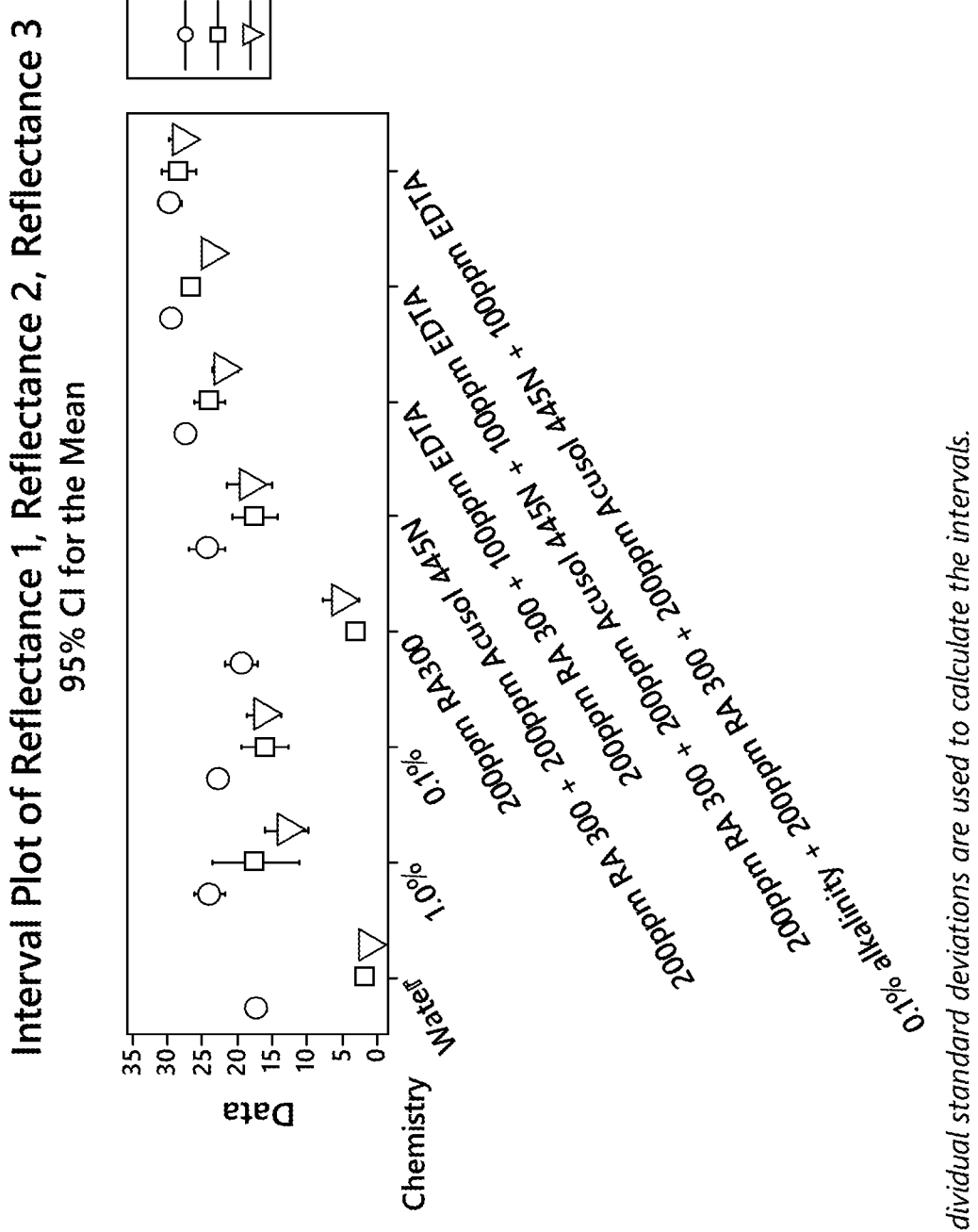

Table 6 and FIG. 9 show that the formulas with 200 ppm alcohol ethoxylate, 200 ppm acrylic acid polymer, and 100 ppm of EDTA, and no alkalinity, provided better cleaning than water and better cleaning that either alkaline control. The addition of 200 ppm alcohol ethoxylate, 200 ppm acrylic acid polymer, and 100 ppm of EDTA in 0.1% sodium bicarbonate and 0.1% sodium carbonate identified in FIG. 9 as "alkalinity" had the best cleaning. In addition to these solutions providing better cleaning, the cleaning performance did not drop off dramatically with successive soiling and cleaning cycles. This shows that the combination of alcohol ethoxylate, acrylic acid, and chelating agent is able to provide good cleaning independent of the alkalinity system and even in the absence of a source of alkalinity. This is a surprising finding because it is very common within CIP cleaning to rely heavily on sources of alkalinity to do most of the soil removal. It was not expected that a booster composition with surfactant, polymer, and chelating agent in low or no alkalinity would be able to outperform the cleaning performance of the alkaline controls.

Example 7

Example 7 tested the cleaning performance of various formulas against three controls: water, a solution of 3% sodium hydroxide, and a solution of 1.5% sodium carbonate. The chemistry tested included various alkaline compositions in combination with Acusol 445N, a polyacrylic acid polymer with a molecular weight of about 7,000, Belclene 200, a polymaleic acid polymer with a molecular weight of about 450, Acusol 425N, an acrylic acid/maleic acid copolymer with a molecular weight of about 1900, Genapol, a nonionic linear alcohol surfactant with 12 and 14 carbon atoms, 5 moles of ethoxylation and 4 moles of propoxylation, Tomodol 1-5 (poly(oxy-1,2-ethanediyl), a-undecyl-w-hydroxy), a nonionic alcohol ethoxylate surfactant with 11 carbon atoms and 5 moles of ethoxylation, and EDTA, a well-known chelating agent. The results are shown in Table 7 and FIG. 10.

TABLE 7

| Test | Chemistry | % Reflectance 1 | % Reflectance 2 | % Reflectance 3 |
|---|---|---|---|---|
| 1 | Water | 11.0 | 9.8 | 1.7 |
| | Water | 11.8 | 14.7 | 3.0 |
| | Water | 14.2 | 10.4 | 2.2 |
| | Water | 14.5 | 9.1 | 2.4 |
| 2 | NaOH 3% | 24.8 | 27.2 | 27.9 |
| | NaOH 3% | 25.9 | 28.4 | 27.7 |
| | NaOH 3% | 24.6 | 28.1 | 28.2 |
| | NaOH 3% | 26.3 | 28.1 | 27.1 |
| 3 | 1.5% carbonate ($Na_2CO_3$) | 19.1 | 23.0 | 17.8 |
| | 1.5% carbonate ($Na_2CO_3$) | 20.3 | 23.0 | 13.6 |
| | 1.5% carbonate ($Na_2CO_3$) | 22.1 | 23.2 | 11.5 |
| | 1.5% carbonate ($Na_2CO_3$) | 21.8 | 22.2 | 12.8 |
| 4 | 1.5% $Na_2CO_3$ + 100 ppm Belclene 200 + 100 ppm Genapol + 100 ppm Tomadol + 100 ppm EDTA | 25.1 | 25.5 | 24.4 |
| | 1.5% $Na_2CO_3$ + 100 ppm Belclene 200 + 100 ppm Genapol + 100 ppm Tomadol + 100 ppm EDTA | 26.2 | 25.9 | 25.0 |
| | 1.5% $Na_2CO_3$ + 100 ppm Belclene 200 + 100 ppm Genapol + 100 ppm Tomadol + 100 ppm EDTA | 25.4 | 26.4 | 21.5 |
| | 1.5% $Na_2CO_3$ + 100 ppm Belclene 200 + 100 ppm Genapol + 100 ppm Tomadol + 100 ppm EDTA | 25.3 | 26.6 | 25.1 |
| 5 | 1.5% carbonate + 100 ppm Genapol + 100 ppm Tomadol | 25.4 | 23.9 | 21.1 |
| | 1.5% carbonate + 100 ppm Genapol + 100 ppm Tomadol | 26.0 | 25.4 | 19.4 |
| | 1.5% carbonate + 100 ppm Genapol + 100 ppm Tomadol | 25.9 | 26.6 | 21.8 |
| | 1.5% carbonate + 100 ppm Genapol + 100 ppm Tomadol | 26.0 | 24.8 | 20.0 |
| 6 | 1.5% carbonate + 100 ppm Tomadol | 23.2 | 25.0 | 16.7 |
| | 1.5% carbonate + 100 ppm Tomadol | 23.5 | 26.2 | 19.0 |
| | 1.5% carbonate + 100 ppm | 23.1 | 25.2 | 19.7 |

TABLE 7-continued

| Test | Chemistry | % Reflectance 1 | % Reflectance 2 | % Reflectance 3 |
|---|---|---|---|---|
| | Tomadol 1.5% carbonate + 100 ppm Tomadol | 23.5 | 26.2 | 18.8 |
| 7 | 4.6% sodium carbonate + 2.8% sodium bicarbonate Alkaline control | 24.1 | 25.1 | 13.5 |
| | 4.6% sodium carbonate + 2.8% sodium bicarbonate | 25.9 | 26.1 | 15.6 |
| | 4.6% sodium carbonate + 2.8% sodium bicarbonate | 26.6 | 22.8 | 13.7 |
| | 4.6% sodium carbonate + 2.8% sodium bicarbonate | 25.0 | 22.5 | 16.9 |
| 8 | 4.6% sodium carbonate + 2.8% sodium bicarbonate + 100 ppm Genapol + 100 ppm Tomadol | 26.0 | 27.2 | 23.7 |
| | 4.6% sodium carbonate + 2.8% sodium bicarbonate + 100 ppm Genapol + 100 ppm Tomadol | 27.9 | 27.3 | 22.2 |
| | 4.6% sodium carbonate + 2.8% sodium bicarbonate + 100 ppm Genapol + 100 ppm Tomadol | 28.4 | 27.7 | 23.5 |
| | 4.6% sodium carbonate + 2.8% sodium bicarbonate + 100 ppm Genapol + 100 ppm Tomadol | 27.1 | 28.2 | 25.2 |
| 9 | 4.6% sodium carbonate + 2.8% sodium bicarbonate + 100 ppm Belclene 200 + 100 ppm Genapol + 100 ppm Tomadol + 100 ppm EDTA | 21.1 | 27.9 | 23.6 |
| | 4.6% sodium carbonate + 2.8% sodium bicarbonate + 100 ppm Belclene 200 + 100 ppm Genapol + 100 ppm Tomadol + 100 ppm EDTA | 20.1 | 28.2 | 26.1 |
| | 4.6% sodium carbonate + 2.8% sodium bicarbonate + 100 ppm Belclene 200 + 100 ppm Genapol + 100 ppm Tomadol + 100 ppm EDTA | 24.2 | 19.1 | 26.1 |
| | 4.6% sodium carbonate + 2.8% sodium bicarbonate + 100 ppm Belclene 200 + 100 ppm Genapol + 100 ppm Tomadol + 100 ppm EDTA | 25.6 | 22.8 | 27.0 |
| 10 | 2.4% sodium carbonate + 2.4% sodium bicarbonate Lower alkaline control | 22.3 | 23.6 | 16.7 |
| | 2.4% sodium carbonate + 2.4% sodium bicarbonate | 21.1 | 22.7 | 18.5 |
| | 2.4% sodium carbonate + 2.4% sodium bicarbonate | 21.4 | 23.5 | 15.9 |
| | 2.4% sodium carbonate + 2.4% sodium bicarbonate | 22.2 | 24.0 | 18.7 |
| 11 | 2.4% sodium carbonate + 2.4% sodium bicarbonate + 100 ppm Genapol + 100 ppm Tomadol | 27.4 | 27.8 | 25.8 |
| | 2.4% sodium carbonate + 2.4% sodium bicarbonate + 100 ppm Genapol + 100 ppm Tomadol | 24.5 | 26.6 | 26.9 |
| | 2.4% sodium carbonate + 2.4% sodium bicarbonate + 100 ppm Genapol + 100 ppm Tomadol | 26.7 | 28.4 | 27.1 |
| | 2.4% sodium carbonate + 2.4% sodium bicarbonate + 100 ppm Genapol + 100 ppm Tomadol | 27.9 | 27.1 | 25.0 |
| 12 | 2.4% sodium carbonate + 2.4% sodium bicarbonate + 100 ppm Belclene 200 + 100 ppm Genapol + 100 ppm Tomadol + 100 ppm EDTA | 28.0 | 28.1 | 25.6 |
| | 2.4% sodium carbonate + 2.4% sodium bicarbonate + 100 ppm Belclene 200 + 100 ppm Genapol + 100 ppm Tomadol + 100 ppm EDTA | 26.9 | 27.9 | 25.4 |
| | 2.4% sodium carbonate + 2.4% sodium bicarbonate + 100 ppm | 26.6 | 27.3 | 25.9 |

TABLE 7-continued

| Test | Chemistry | % Reflectance 1 | % Reflectance 2 | % Reflectance 3 |
|---|---|---|---|---|
|  | Belclene 200 + 100 ppm Genapol + 100 ppm Tomadol + 100 ppm EDTA |  |  |  |
|  | 2.4% sodium carbonate + 2.4% sodium bicarbonate + 100 ppm Belclene 200 + 100 ppm Genapol + 100 ppm Tomadol + 100 ppm EDTA | 27.3 | 21.7 | 25.8 |
| 13 | 1000 ppm carbonate | 17.9 | 19.5 | 21.3 |
|  | 1000 ppm carbonate | 16.7 | 17.9 | 16.0 |
|  | 1000 ppm carbonate | 17.7 | 17.5 | 17.5 |
|  | 1000 ppm carbonate | 17.0 | 19.4 | 16.1 |
| 14 | 1000 ppm carbonate + 100 ppm Genapol + 100 ppm Tomadol | 23.4 | 25.2 | 22.3 |
|  | 1000 ppm carbonate + 100 ppm Genapol + 100 ppm Tomadol | 27.4 | 28.4 | 24.8 |
|  | 1000 ppm carbonate + 100 ppm Genapol + 100 ppm Tomadol | 25.4 | 27.3 | 22.3 |
|  | 1000 ppm carbonate + 100 ppm Genapol + 100 ppm Tomadol | 25.0 | 26.8 | 23.2 |
| 15 | 1000 ppm carbonate 100 ppm Belclene 200 + 100 ppm Genapol + 100 ppm Tomadol + 100 ppm | 28.1 | 28.3 | 21.5 |
|  | 1000 ppm carbonate 100 ppm Belclene 200 + 100 ppm Genapol + 100 ppm Tomadol + 100 ppm | 28.4 | 28.4 | 23.5 |
|  | 1000 ppm carbonate 100 ppm Belclene 200 + 100 ppm Genapol + 100 ppm Tomadol + 100 ppm | 29.0 | 28.6 | 24.9 |
|  | 1000 ppm carbonate 100 ppm Belclene 200 + 100 ppm Genapol + 100 ppm Tomadol + 100 ppm | 28.7 | 28.6 | 25.2 |
| 16 | 1000 ppm carbonate + 100 ppm Tomadol | 27.7 | 28.1 | 25.1 |
|  | 1000 ppm carbonate + 100 ppm Tomadol | 28.3 | 28.4 | 24.8 |
|  | 1000 ppm carbonate + 100 ppm Tomadol | 28.2 | 28.2 | 25.0 |
|  | 1000 ppm carbonate + 100 ppm Tomadol | 26.8 | 27.9 | 24.2 |

Figure 10:
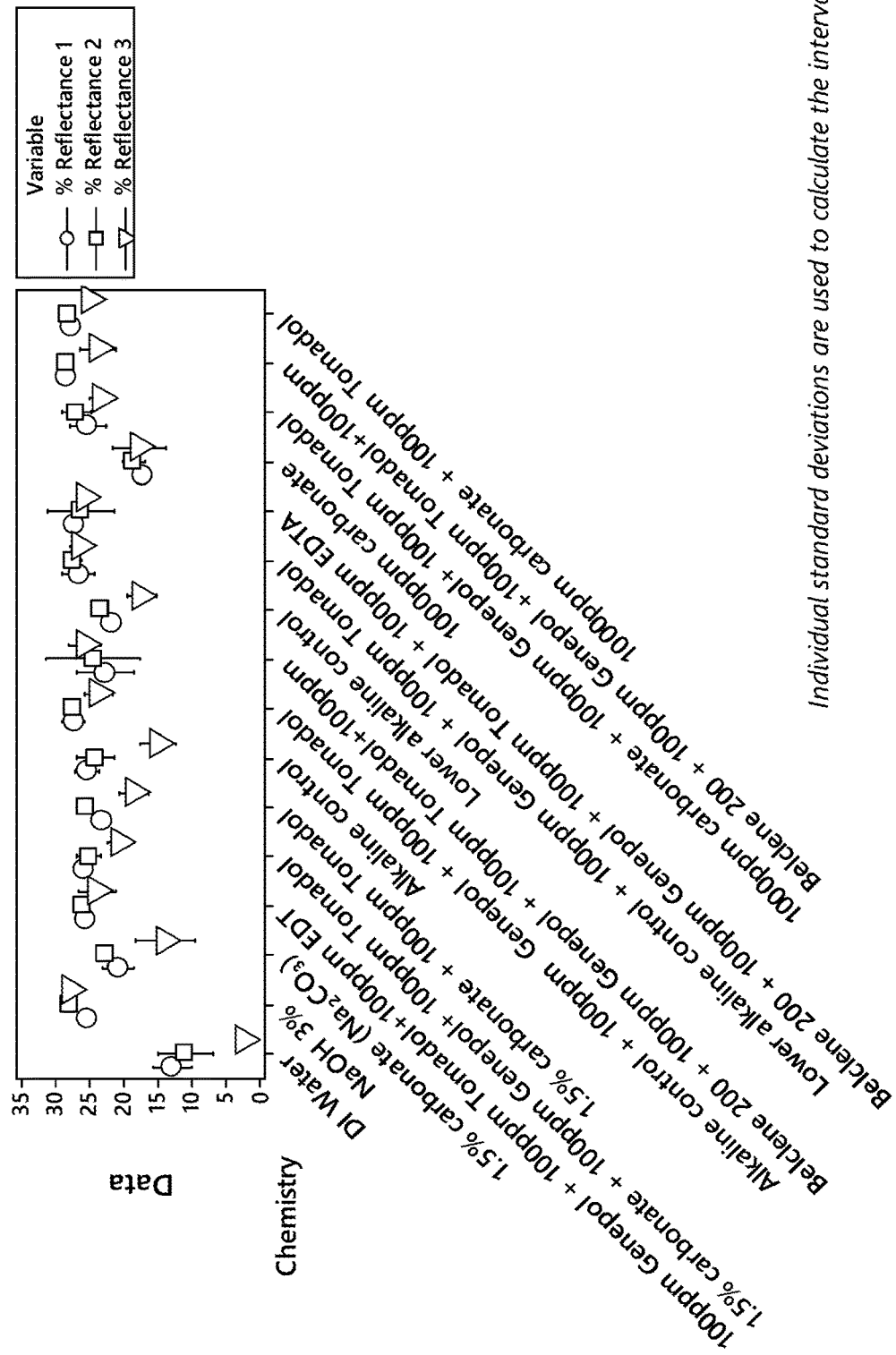

The results shown in Table 7 and FIG. 10 indicate multiple combinations of alkalinity and booster composition, with and without EDTA, provide comparable or improved cleaning over the alkaline controls and consistent cleaning from one cleaning cycle to the next.

Example 8

Example 8 evaluated the effect of cleaning temperature on cleaning performance. This test was run at 80° C. whereas the other examples were run at 60° C. Various formulas were tested against four controls: water, a formula of 1.0% sodium carbonate and 1.0% sodium bicarbonate, a formula of 0.6% sodium carbonate and 0.6% sodium bicarbonate, and a formula of 0.3% sodium carbonate and 0.3% sodium bicarbonate. The booster chemistry tested included the Acusol 445N polymer, EDTA in an amount of either 100 ppm or 150 ppm, and Plurafac RA30. The results are shown in Table 8 and FIG. 11.

TABLE 8

| Test | Chemistry | % Reflectance 1 | % Reflectance 2 | % Reflectance 3 |
|---|---|---|---|---|
| 1 | Water | 12.6 | 2.4 | 1.2 |
|  | Water | 15.1 | 2.9 | 1.1 |
|  | Water | 11.4 | 3.3 | 1 |
|  | Water | 12.4 | 2.8 | 1.2 |
| 2 | 1.0% | 19.8 | 13.8 | 7.9 |
|  | 1.0% | 22.9 | 13.5 | 9.9 |
|  | 1.0% | 21.7 | 16 |  |
|  | 1.0% | 21.5 | 11.4 | 8.6 |
| 3 | 0.6% | 21.5 | 11.7 | 10.9 |
|  | 0.6% | 21.4 | 11.2 | 8.6 |
|  | 0.6% | 23.2 | 14.7 | 11.3 |
|  | 0.6% | 24.1 | 12.4 | 11 |

TABLE 8-continued

| Test | Chemistry | % Reflectance 1 | % Reflectance 2 | % Reflectance 3 |
|---|---|---|---|---|
| 4 | 0.3% | 21.2 | 15 | 12.3 |
|  | 0.3% | 19.1 | 13.5 | 8.9 |
|  | 0.3% | 21.1 | 14 | 6.4 |
|  | 0.3% | 21 | 14.6 | 13 |
| 5 | 1.0% + 200 ppm Acusol 445N + 200 ppm RA300 + 100 ppm EDTA | 25.8 | 13.4 | 14.3 |
|  | 1.0% + 200 ppm Acusol 445N + 200 ppm RA300 + 100 ppm EDTA | 24.5 | 12.6 | 10.1 |
|  | 1.0% + 200 ppm Acusol 445N + 200 ppm RA300 + 100 ppm EDTA | 27.1 | 17.9 | 15.4 |
|  | 1.0% + 200 ppm Acusol 445N + 200 ppm RA300 + 100 ppm EDTA | 25.9 | 14.9 | 13 |
| 6 | 0.6% + 200 ppm Acusol 445N + 200 ppm RA300 + 100 ppm EDTA | 28.6 | 18.9 | 21.1 |
|  | 0.6% + 200 ppm Acusol 445N + 200 ppm RA300 + 100 ppm EDTA | 28.2 | 23.1 | 19.8 |
|  | 0.6% + 200 ppm Acusol 445N + 200 ppm RA300 + 100 ppm EDTA | 27.2 | 20 | 16.6 |
|  | 0.6% + 200 ppm Acusol 445N + 200 ppm RA300 + 100 ppm EDTA | 29.7 | 22.7 | 23.8 |
| 7 | 0.3% + 200 ppm Acusol 445N + 200 ppm RA300 + 100 ppm EDTA | 30.6 | 27.8 | 28.2 |
|  | 0.3% + 200 ppm Acusol 445N + 200 ppm RA300 + 100 ppm EDTA | 29.4 | 26.8 | 26.5 |
|  | 0.3% + 200 ppm Acusol 445N + 200 ppm RA300 + 100 ppm EDTA | 28.6 | 25.6 | 25.4 |
|  | 0.3% + 200 ppm Acusol 445N + 200 ppm RA300 + 100 ppm EDTA | 29.1 | 27.6 | 27.2 |
| 8 | 1.0% + 300 ppm Acusol 445N + 200 ppm RA300 + 150 ppm EDTA | 26.5 | 15.5 | 13 |
|  | 1.0% + 300 ppm Acusol 445N + 200 ppm RA300 + 150 ppm EDTA | 28.3 | 18.1 | 12.5 |
|  | 1.0% + 300 ppm Acusol 445N + 200 ppm RA300 + 150 ppm EDTA | 26.5 | 18 | 15.8 |
|  | 1.0% + 300 ppm Acusol 445N + 200 ppm RA300 + 150 ppm EDTA | 28 | 18.2 | 17.9 |
| 9 | 0.6% + 300 ppm Acusol 445N + 200 ppm RA300 + 150 ppm EDTA | 27.6 | 23.3 | 22.1 |
|  | 0.6% + 300 ppm Acusol 445N + 200 ppm RA300 + 150 ppm EDTA | 26 | 22.9 | 22.3 |
|  | 0.6% + 300 ppm Acusol 445N + 200 ppm RA300 + 150 ppm EDTA | 28 | 26.7 | 25.6 |
|  | 0.6% + 300 ppm Acusol 445N + 200 ppm RA300 + 150 ppm EDTA | 27.6 | 25.6 | 25.8 |
| 10 | 0.3% + 300 ppm Acusol 445N + 200 ppm RA300 + 150 ppm EDTA | 29 | 26.4 | 26.3 |
|  | 0.3% + 300 ppm Acusol 445N + 200 ppm RA300 + 150 ppm EDTA | 27.6 | 25.6 | 23.4 |
|  | 0.3% + 300 ppm Acusol 445N + 200 ppm RA300 + 150 ppm EDTA | 29 | 27.3 | 24.5 |
|  | 0.3% + 300 ppm Acusol 445N + 200 ppm RA300 + 150 ppm EDTA | 29.3 | 27.9 | 25.9 |

Figure 11:
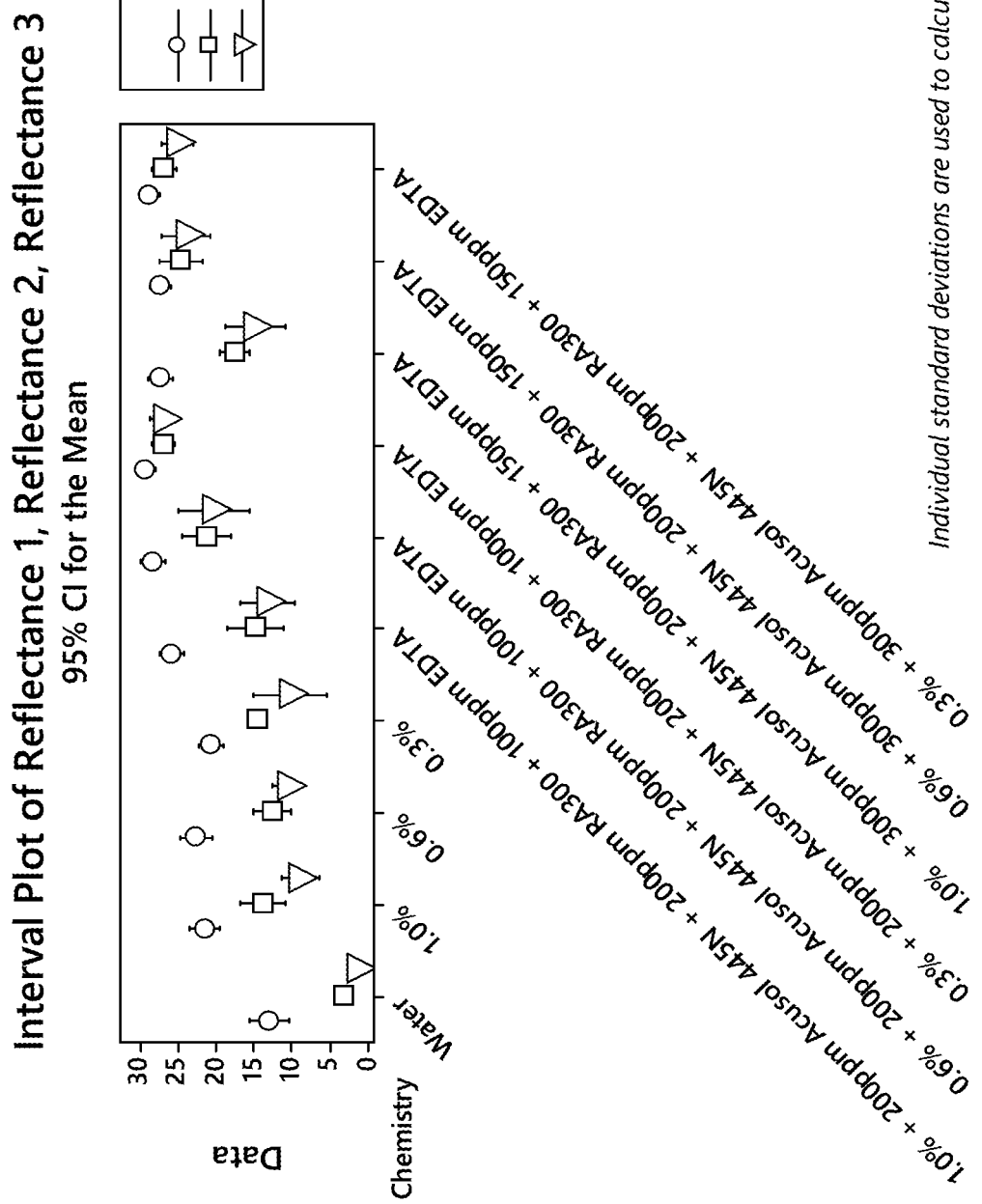

The results shown in Table 8 and FIG. 11 demonstrate comparable results at 80° C. to results seen in trials conducted at 60° C. (i.e., Examples 4, 5, 6). In Examples 4, 5, and 6, formulas with varying amounts of sodium carbonate and sodium bicarbonate, Acusol 445N polymer, Plurafac RA 300, and EDTA were tested at a temperature of 60° C. While the exact data between these examples varies, a general trend can be seen in examples which tested this type of chemistry: a high reflectance in the initial cleaning and continued high reflectance in subsequent cleanings. Likewise, the results shown in Table 8 and FIG. 11 demonstrate high reflectance in the initial cleaning and continued high reflectance in subsequent cleanings. This data set is useful as many CIP systems operate at temperatures near 80° C.

Example 9

Example 9 evaluated the effect of increasing RA300 concentrations against four controls: water, a solution of 1.0% sodium carbonate and 1.0% sodium bicarbonate, a solution of 0.5% sodium carbonate and 0.5% sodium bicarbonate, and a solution of 0.1% sodium carbonate and 0.1% sodium bicarbonate. The booster chemistry tested included the Acusol 445N polymer, Plurafac RA30, and EDTA. Results are shown in Table 9 and FIG. 12.

TABLE 9

| Test | Chemistry | % Reflectance 1 | % Reflectance 2 | % Reflectance 3 |
|---|---|---|---|---|
| 1 | Water | 21.3 | 11.4 | 1 |
|   | Water | 18 | 9.4 | 0.8 |
|   | Water | 21.4 | 9.4 | 0.7 |
|   | Water | 17.6 | 8 | 0.7 |
| 2 | 1.0% | 25.6 | 24.7 | 13.9 |
|   | 1.0% | 24.8 | 24.2 | 12 |
|   | 1.0% | 26.2 | 23.1 | 13 |
|   | 1.0% | 27.2 | 24.8 | 24.1 |
| 3 | 0.5% | 23 | 24.9 | 20.1 |
|   | 0.5% | 25.1 | 24.9 | 15.1 |
|   | 0.5% | 25.1 | 24.4 | 22.1 |
|   | 0.5% | 22.3 | 25 | 22.2 |
| 4 | 0.1% | 24.3 | 21.9 | 23.8 |
|   | 0.1% | 24.4 | 21.3 | 23.7 |
|   | 0.1% | 23.8 | 21.7 | 24.3 |
|   | 0.1% | 24.1 | 22.3 | 25 |
| 5 | 1.0% + 200 ppm Acusol 445N + 200 ppm RA300 + 100 ppm EDTA | 26.2 | 22.8 | 12.6 |
|   | 1.0% + 200 ppm Acusol 445N + 200 ppm RA300 + 100 ppm EDTA | 25.3 | 20.7 | 17.6 |
|   | 1.0% + 200 ppm Acusol 445N + 200 ppm RA300 + 100 ppm EDTA | 27.2 | 22.9 | 18 |
|   | 1.0% + 200 ppm Acusol 445N + 200 ppm RA300 + 100 ppm EDTA | 27.1 | 23 | 12.6 |
| 6 | 0.5% + 200 ppm Acusol 445N + 200 ppm RA300 + 100 ppm EDTA | 28.8 | 17.4 | 20.2 |
|   | 0.5% + 200 ppm Acusol 445N + 200 ppm RA300 + 100 ppm EDTA | 28.5 | 21.1 | 22.7 |
|   | 0.5% + 200 ppm Acusol 445N + 200 ppm RA300 + 100 ppm EDTA | 27.6 | 24.5 | 21.7 |
|   | 0.5% + 200 ppm Acusol 445N + 200 ppm RA300 + 100 ppm EDTA | 29 | 22.4 | 16.9 |
| 7 | 0.1% + 200 ppm Acusol 445N + 200 ppm RA300 + 100 ppm EDTA | 30 | 24.1 | 27.9 |
|   | 0.1% + 200 ppm Acusol 445N + 200 ppm RA300 + 100 ppm EDTA | 29.7 | 28.3 | 25.4 |

TABLE 9-continued

| Test | Chemistry | % Reflectance 1 | % Reflectance 2 | % Reflectance 3 |
|---|---|---|---|---|
| | 0.1% + 200 ppm Acusol 445N + 200 ppm RA300 + 100 ppm EDTA | 29.7 | 26.3 | 26.2 |
| | 0.1% + 200 ppm Acusol 445N + 200 ppm RA300 + 100 ppm EDTA | 29.7 | 28.4 | 24 |
| 8 | 1.0% + 200 ppm Acusol 445N + 500 ppm RA300 + 100 ppm EDTA | 28.4 | 28.5 | 23.6 |
| | 1.0% + 200 ppm Acusol 445N + 500 ppm RA300 + 100 ppm EDTA | 28.6 | 27.8 | 21.5 |
| | 1.0% + 200 ppm Acusol 445N + 500 ppm RA300 + 100 ppm EDTA | 27.7 | 26.1 | 23 |
| | 1.0% + 200 ppm Acusol 445N + 500 ppm RA300 + 100 ppm EDTA | 28.3 | 26.8 | 21.8 |
| 9 | 0.5% + 200 ppm Acusol 445N + 500 ppm RA300 + 100 ppm EDTA | 29.2 | 26.8 | 24.5 |
| | 0.5% + 200 ppm Acusol 445N + 500 ppm RA300 + 100 ppm EDTA | 29.3 | 24.5 | 24.1 |
| | 0.5% + 200 ppm Acusol 445N + 500 ppm RA300 + 100 ppm EDTA | 29.5 | 23.9 | 24.1 |
| | 0.5% + 200 ppm Acusol 445N + 500 ppm RA300 + 100 ppm EDTA | 30.1 | 25.1 | 25 |
| 10 | 0.1% + 200 ppm Acusol 445N + 500 ppm RA300 + 100 ppm EDTA | 29.7 | 25.8 | 27.3 |
| | 0.1% + 200 ppm Acusol 445N + 500 ppm RA300 + 100 ppm EDTA | 29.9 | 26.5 | 25.3 |
| | 0.1% + 200 ppm Acusol 445N + 500 ppm RA300 + 100 ppm EDTA | 29.8 | 26.9 | 25.6 |
| | 0.1% + 200 ppm Acusol 445N + 500 ppm RA300 + 100 ppm EDTA | 30.1 | 25.3 | 28.5 |
| 11 | 1.0% + 200 ppm Acusol 445N + 1000 ppm RA300 + 100 ppm EDTA | 28.6 | 28.7 | 25.5 |
| | 1.0% + 200 ppm Acusol 445N + 1000 ppm RA300 + 100 ppm EDTA | 29.1 | 26.9 | 24.9 |
| | 1.0% + 200 ppm Acusol 445N + 1000 ppm RA300 + 100 ppm EDTA | 27 | 26.2 | 28.4 |
| | 1.0% + 200 ppm Acusol 445N + 1000 ppm RA300 + 100 ppm EDTA | 27.3 | 27.1 | 25.9 |
| 12 | 0.5% + 200 ppm Acusol 445N + 1000 ppm RA300 + 100 ppm EDTA | 29.3 | 25.8 | 26.5 |
| | 0.5% + 200 ppm Acusol 445N + 1000 ppm RA300 + 100 ppm EDTA | 29.3 | 25.5 | 28 |
| | 0.5% + 200 ppm Acusol 445N + 1000 ppm RA300 + 100 ppm EDTA | 29.4 | 26.4 | 27.8 |
| | 0.5% + 200 ppm Acusol 445N + 1000 ppm RA300 + 100 ppm EDTA | 28.8 | 23.6 | 25.6 |
| 13 | 0.1% + 200 ppm Acusol 445N + 1000 ppm RA300 + 100 ppm EDTA | 29.9 | 29 | 28.5 |
| | 0.1% + 200 ppm Acusol 445N + 1000 ppm RA300 + 100 ppm EDTA | 29.9 | 28.3 | 27.3 |
| | 0.1% + 200 ppm Acusol 445N + 1000 ppm RA300 + 100 ppm EDTA | 31.4 | 28 | 26.2 |

TABLE 9-continued

| Test | Chemistry | % Reflectance 1 | % Reflectance 2 | % Reflectance 3 |
|---|---|---|---|---|
| | 0.1% + 200 ppm Acusol 445N + 1000 ppm RA300 + 100 ppm EDTA | 29.6 | 27.2 | 26 |

Figure 12:
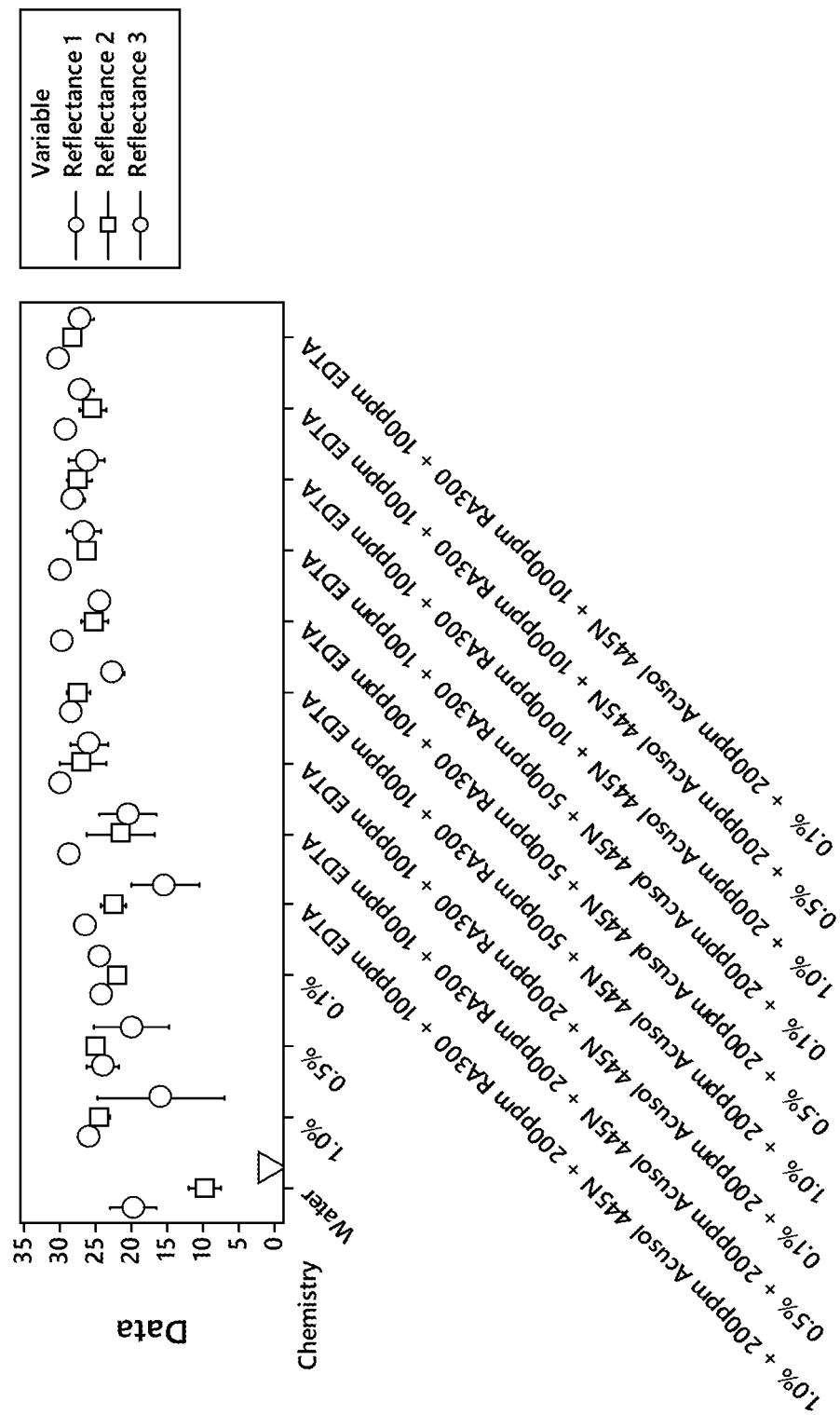

At high alkalinity concentrations (e.g., a pH of 9.5 and above), the results seen in Table 9 and FIG. 12 do not show a benefit when RA300 concentration is increased. The results did show increased performance when RA300 concentration is increased at lower alkalinity levels (e.g., a pH below 9.5).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of cleaning a fermentation tank comprising:
   a. circulating an alkali metal hydroxide from a storage tank through a clean-in-place system comprising a first circuit comprising a first fluid path from the storage tank, through the first circuit, and back to the storage tank, and a second circuit comprising a second fluid path from the storage tank, to a fermentation tank along the second circuit, and back to the storage tank, wherein the first fluid path and the second fluid path are different and the first fluid path does not pass through the fermentation tank;
   b. adding a first composition to the alkali metal hydroxide in the second circuit after the storage tank and before or in the fermentation tank to form a second composition, the first composition comprising at least one of a nonionic surfactant, a polymer, and a chelating agent;
   c. returning the second composition in the fermentation tank to the storage tank.

2. The method of claim 1, further comprising recirculating the second composition in the fermentation tank.

3. The method of claim 1, further comprising reacting a portion of the alkali metal hydroxide with carbon dioxide or carbonic acid in the fermentation tank to form alkali metal carbonate or alkali metal bicarbonate.

4. The method of claim 1, wherein the first composition comprises the nonionic surfactant, the polymer, and the chelating agent.

5. The method of claim 1, wherein the first composition further comprises at least one of a corrosion inhibitor or an antifoaming agent.

6. The method of claim 1, wherein the second composition comprises the first composition, the alkali metal hydroxide, alkali metal carbonate, and alkali metal bicarbonate.

7. The method of claim 1, wherein the second composition comprises the first composition, alkali metal carbonate, and alkali metal bicarbonate.

8. The method of claim 1, wherein the second composition is free of alkali metal hydroxide after 30 minutes after combining the first composition with the alkali metal hydroxide.

9. The method of claim 1, wherein the nonionic surfactant is an alcohol alkoxylate.

10. The method of claim 1, wherein the polymer is a polymer of acrylic acid.

11. The method of claim 1, wherein the chelating agent is EDTA.

12. The method of claim 1, wherein the first composition consists of feed additive-compatible ingredients.

13. The method of claim 2, wherein the second composition is recirculated in the fermentation tank for 15 to 90 minutes.

* * * * *